(12) United States Patent
Jackson et al.

(10) Patent No.: US 12,495,787 B2
(45) Date of Patent: Dec. 16, 2025

(54) HYBRID COMPLEMENTARY MECHANICAL AND UNNATURAL ILLUMINATION TWIN PROCESS FOR REDUCED SEED GERMINATION VIABILITY

(71) Applicants: Jonathan A Jackson, Dayton, OH (US); Mark J Elting, Lexington, VA (US); Patrick A Jackson, Dayton, OH (US)

(72) Inventors: Jonathan A Jackson, Dayton, OH (US); Mark J Elting, Lexington, VA (US); Patrick A Jackson, Dayton, OH (US)

(73) Assignee: Global Neighbor Inc, Dayton, OH (US)

( * ) Notice: Subject to any disclaimer, the term of this patent is extended or adjusted under 35 U.S.C. 154(b) by 616 days.

(21) Appl. No.: 17/970,543

(22) Filed: Oct. 20, 2022

(65) Prior Publication Data
US 2024/0130351 A1  Apr. 25, 2024
US 2024/0224979 A9  Jul. 11, 2024

(51) Int. Cl.
*A01M 21/00* (2006.01)
*A01F 12/40* (2006.01)
*B01J 19/12* (2006.01)
*B02C 9/04* (2006.01)
*B02C 13/20* (2006.01)

(52) U.S. Cl.
CPC ............ *A01M 21/00* (2013.01); *A01F 12/40* (2013.01); *B01J 19/128* (2013.01); *B02C 9/04* (2013.01); *B02C 13/205* (2013.01); *B01J 2219/1203* (2013.01)

(58) Field of Classification Search
CPC ....... A01M 21/00; A01F 12/40; B01J 19/128; B01J 2219/1203; B02C 9/04; B02C 13/205
See application file for complete search history.

(56) References Cited

U.S. PATENT DOCUMENTS 8,152,610 B2    4/2012  Harrington
8,872,136 B1 *  10/2014  Jackson ................ A01M 21/00
                                              250/492.1

(Continued)

*Primary Examiner* — Claude J Brown
(74) *Attorney, Agent, or Firm* — Elting Patents & Technology LLC; Mark J Elting

(57) ABSTRACT

A hybrid twin process uses an independent mechanical destructive process and an illumination process to change of state of weed seeds to having reduced germination viability by illuminating a seed with at least one of 2 J/cm² cumulative illumination energy, and 0.2 W/cm² irradiance, but no more than 7 W/cm² average irradiance, of at least one of an Indigo Region Illumination Distribution (IRID), and infrared radiation that is substantially Medium Wavelength Infrared (MWIR) radiation, preferably 2-8 microns. The process can be incorporated into a harvester combine to convert a tailings flow prior to discharge on an agricultural field. For the mechanical destructive process, high required applied energy, noise, wear, and difficulty treating impact-resistant seeds are avoided by modifying a driven load flow via increased capability of exposure to illumination and under-driving the mechanical destructive process. This can include randomization, rarefaction and enhanced circulation.

18 Claims, 19 Drawing Sheets

TWIN PROCESS with EXPOSURE THEATER
Inside DRIVEN LOAD FLOW MANIFOLD (M)

(56) References Cited

U.S. PATENT DOCUMENTS

| | | |
|---|---|---|
| 10,004,176 B2 | 6/2018 | Mayerle |
| 12,219,947 B2 * | 2/2025 | Jackson .............. A01M 21/046 |
| 2017/0034997 A1 | 2/2017 | Mayerle |
| 2018/0070534 A1 | 3/2018 | Mayerle |
| 2018/0317392 A1 | 11/2018 | Mayerle |
| 2019/0059231 A1 | 2/2019 | Mayerle |
| 2020/0128732 A1 * | 4/2020 | Chaney ................. A01M 21/02 |
| 2020/0236850 A1 | 7/2020 | Mayerle |
| 2021/0243950 A1 * | 8/2021 | Blank ................... A01M 21/02 |
| 2022/0008889 A1 | 1/2022 | Jackson et al. |

\* cited by examiner

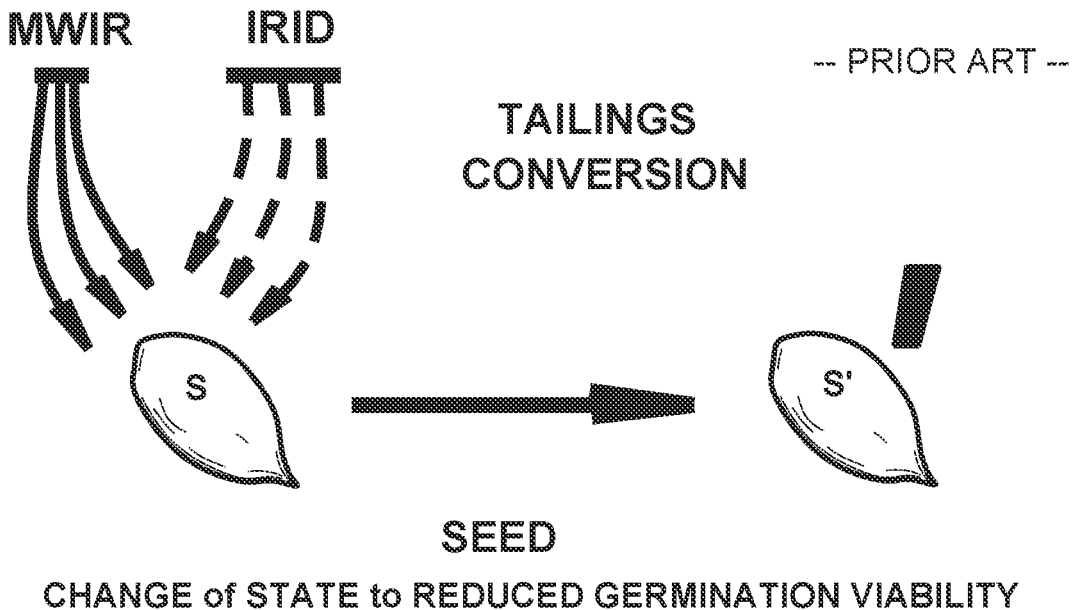
Fig. 5
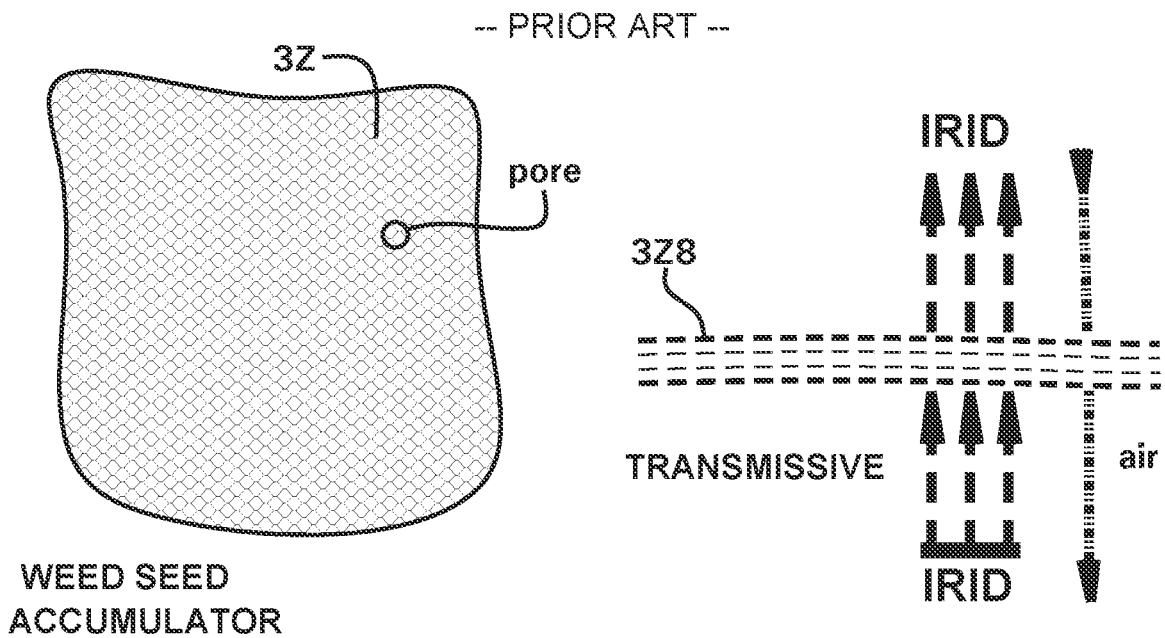
Fig. 6
Fig. 7

-- PRIOR ART --

HARVEST TAILINGS LOAD
under MECHANICAL DESTRUCTIVE PROCESS
S E E D / F L O R E T   C H A R A C T E R I S T I C S

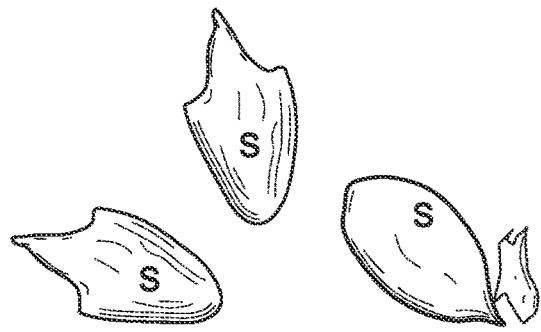
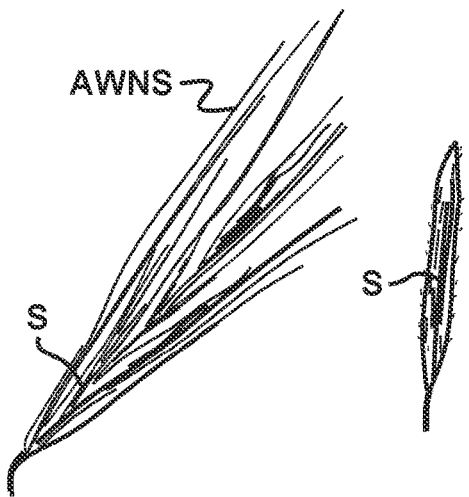

| AMBROSIA TRIFIDA (GIANT RAGWEED) | BROMUS TECTORUM (CHEATGRASS) |
|---|---|
| LOWER IMPACT RESISTANCE | HIGHER IMPACT RESISTANCE |
| PHYSICS of IMPACT<br>---- HARD SHELL<br>---- DENSE | PHYSICS of IMPACT<br>---- CUSHIONED<br>---- FEATHERY |
| ROTOR ACTION on SEED<br>---- SLAP / GRAZE<br>---- INJURY | ROTOR ACTION on SEED<br>---- LAUNCH<br>---- POSSIBLE INJURY |
| STRUCTURE<br>---- Seed Coat<br>---- Associated Chaff<br>---- Glabrous (Hairless) | STRUCTURE<br>---- Glumes<br>---- Spikelets<br>---- Florets<br>---- Awns |
| MEDIUM APPLIED POWER TO OBTAIN 80 PERCENT RSE | HIGH APPLIED POWER TO OBTAIN 80 PERCENT RSE |

*Fig. 16*

MECHANICAL DESTRUCTIVE PROCESS

-- PRIOR ART --

TWO RING ROTOR

MECHANICAL DESTRUCTIVE PROCESS

Interleaves with Three Ring Stator

-- PRIOR ART --

THREE RING STATOR

MECHANICAL DESTRUCTIVE PROCESS
with DRIVEN LOAD FLOW MANIFOLD (M)

TWIN PROCESS with EXPOSURE THEATER inside DRIVEN LOAD FLOW MANIFOLD (M)

TWIN PROCESS with EXPOSURE THEATER inside DRIVEN LOAD FLOW MANIFOLD (M)

HYBRID COMPLEMENTARY MECHANICAL AND UNNATURAL ILLUMINATION TWIN PROCESS FOR REDUCED SEED GERMINATION VIABILITY

TECHNICAL FIELD

This invention relates to a hybrid beneficially complementary twin process to operate upon seeds that are part of a harvest tailings load, to induce a change of state in the seeds to having reduced germination viability in a time under one minute. The twin process combines a modified and optionally underdriven mechanical destructive process with an illumination process that uses one or both of two separated general light wavelength ranges of brief illumination. The invention does not use mutagenic or high radiative energy transfers in any energy or wavelength, heat shock, incineration, seed cooking or the like.

BACKGROUND OF THE INVENTION

Agriculture and food industries represent approximately $1 trillion of US GDP (Gross Domestic Product), much of it direct output from over 2 million farms on nearly 900 million acres of land. Modern farming has become a highly-intensive endeavor involving large relative amounts of financial investment and risk, use of complex and expensive equipment, skill and mastery over complex farming techniques and operations, and acutely focused attention to, and knowledge of, crop and animal biology; environments created by weather, effects of soil and decomposing biological matter, and many varied actions of competing plants, animals and microorganisms.

Weed interference with crops is a huge factor limiting crop and agricultural productivity in North America and around the world. In every farm field, weed populations can reduce crop yields, via deleterious effects on crop growth and development, and via competition for light, water, and nutrients. Herbicides are widely used to manage weed seed populations, but many weeds cannot be fully controlled and they ultimately produce seeds which form part of a soil seedbank that can survive for years and provide a ready supply of new weeds. This affects profitability of farming operations, and the weed seed bank composition can affect the sale value of agricultural land.

In particular, crop yields are most affected during early crop development, and there is a Critical Period for Weed Control (CPWC) to avoid unacceptable crop yield parasitic losses. Chemicals excreted into soil by a weed can affect growth and development of a crop species. This is so-called allelopathy, where exudation of chemical compounds by one plant has negatives on a neighboring plant. In the fight for survival, plants rely on a complex sensory system to detect the presence of neighboring plants, resulting in compensatory mechanisms like shade avoidance, which tends to cause more leaf growth, and taller stem growth, at the expense, relatively, of root development. This affects the normal course of growth and development. Farmers often rely on herbicides, tillage and the use of cover crops and organic weed control techniques to keep weed populations low to not reduce yields and overall profitability.

One goal is to reduce the size of the weed seed bank. See [REF 1: Dynamics and management of crop-weed interference, Eric R. Page, Chris J. Willenborg, Praire Soils & Crops Journal, Volume 6, 2013, pgs 24-32]. Weed seeds include: palmer amaranth, waterhemp, common lambsquarters, giant foxtail, velvetleaf, ivyleaf morning glory, giant ragweed, common cocklebur and Italian Ryegrass. These and other plant seeds are storage organs for resources needed to support germination and the energy reserves are an excellent food source for animals that live in agricultural fields, such as ground beetles, crickets, and mice. Such animals consume a small portion of the weed seed bank, but typically most of the weed seed bank remains. Another weed, *Amaranthus tuberculatus* or tall waterhemp (related to amaranth) affects US agriculture, and is resistant to Roundup®, a systemic glyphosate-based herbicide. Tall waterhemp has also been reported resistant to acetolactate synthase inhibiting (ALS) herbicides and the triazines. ALS inhibitors affect seedling growth, and in older plants, can cause malformation, stunted growth and decreased seed production, and are potent at low levels. Resistance of this weed to acifluorfen and other diphenyl ether herbicides has been reported as well. Tall waterhemp produces three million small black seeds per plant, and its weed seed can persist in the weed seedbank in a dormant state for several years, even decades.

Many other herbicide-resistant weeds are prolific seed producers. Herbicide resistance was first observed over 20 years ago and one third of herbicide-resistant weeds became resistant within the last 5 years. This is a growing problem with critical implications for agriculture, the environment and US Department of Agriculture goal to encourage regenerative farming practices.

One prolific seed producer is *Bromus TECTORUM* (Cheatgrass), considered a noxious weed injurious to the success of agriculture, especially in the western United States. Cheatgrass is highly invasive. It greens and sets seed earlier than slower-growing native species and crops, and its shallow spread root system absorbs moisture and disrupts the biological soil crust. *Bromus tectorum* can produce over 1000 seeds per plant, and the seeds can survive up to three years in soil. Another is *Ambrosia trifida* (Giant Ragweed). When maturing it can grow to be 4.5 m (15 feet) tall and it often grows higher than competing crops. Each plant can produce 5000 seeds.

Reducing the use of herbicides generally for weed and plant control has become an issue of national importance. Ninety-five percent of fresh water on earth is ground water. Ground water is found in natural rock formations called aquifers, and are a vital natural resource with many uses. Over 50% of the USA population relies on ground water as a source of drinking water, especially in rural areas. Use of herbicides adversely impacts the quality of ground water. Most herbicides are persistent, soluble in water, and ingestion at high toxicity levels can be carcinogenic, affecting the human nervous system and causing endocrine disruption. In the USA, concerns about the potential impacts of herbicides on human health, as well as on terrestrial and aquatic ecosystems, have led to a wide range of monitoring and management programs by state and federal agencies, such as the U.S. Environmental Protection Agency (USEPA). For example, atrazine is a toxic, white, crystalline solid organic compound widely used as an herbicide for control of broadleaf and grassy weeds, and has been detected in concentrations problematic for human and animal health.

In agricultural grain production, desirable yield known generally as cash crops or grains can include small seed grains, like alfalfa, canola, flax, grass seeds, millet, mustard, oats, rape seed, rice, rye and triticale; medium-size seeds, like barley, lentils, popcorn, safflower, sorghum, and wheat; and large seeds, like chickpeas, corn, edible beans, lupins, navy beans, peas, soybeans and sunflowers.

Farmers often use cover crops, as an alternative to use of herbicides. A cover crop is intentionally planted as an intermediate step to planting the cash crop and functions to keep weeds from growing through. The cover crop is then killed, often along with the seeds of weeds. Typically, farmers use machines that roll the cover crop, folding it like a mat, in between rows of the cash crop. Cover crop dieback provides nutrients to the soil.

A prime mover for agriculture around the world for harvesting a cash crop is the harvester combine, or "combine," for short. It is so named because it usually performs three functions: [1] reaping the crop (gathering and cutting); [2] threshing the grain, to remove it from the plant that is harvested; and [3] separating the grain from chaff, tailings, and confounding materials, including cleaning and materials handling. Combines are complex, expensive and have helped produce an economic and agricultural boon around the world. Manufacturers include John Deere, Case International Harvester, New Holland, Massey Ferguson, Claas, and others.

In older combine harvester designs, a turning cylinder threshes the crop, then reciprocating straw walkers takes grain from the crop. In newer designs that are more prevalent today, a specialized rotor or twin rotors both thresh and separate the grain from the plant. In hybrid designs, a cylinder threshes the grain, then the grain is passed to two specialized rotors that separate the grain from the plant. The grain is typically loaded using augers or other transport into a tank at the top of the combine, or off-loaded.

Specifically, a unit called a header (cutting platform) divides, gathers and cuts the crop and the harvest is augered or transported to the threshing unit. The threshing unit separates the grain or cash crop from the ears, husks, stems, and straw, and the separator separates grain from chaff, which itself can contain weed seeds. In threshing, impact, rubbing action, and centrifugal forces are used to urge grains or beans from the MOG (material other than grain). Tangential threshing cylinders or units with raspbars, or rotary separation are used, with axial or tangential harvest paths. For information on combine harvesters, see [REF 2: CIGR Handbook of Agricultural Engineering, Volume 111, Plant Production Engineering, Edited by CIGR (The International Commission of Agricultural Engineering), Volume Editors Bill A. Stout, Bernard Cheze, Published by the American Society of Agricultural Engineers, © 1999, hereby incorporated in this disclosure in its entirety].

Interestingly, as can be appreciated, combines operated to harvest cash crops also incidentally harvest weeds, whose weed seeds are separated from the rest of the plant and the grain. In combines, weed seeds are indeed successfully separated from the cash crop, but combines nonetheless generate huge amounts of biomass tailings which contain weed seeds. These weed seeds are discarded back into the field with chaff, and remain viable to grow into nuisance weeds in following seasons, and to contribute to the weed seed bank.

There are typically two waste paths coming out of a combine. Larger waste such as straw exits or is "walked" out of the top of the combine machine; and smaller waste is sent out the back of the combine, often tossed by a spreader, either on surface or in a trench. The combine gets nearly all seeds, including those from any cover crop, and from the cash crop. Weed seeds are also sent out back of combine with the smaller waste, often tossed by a spreader. Weed seeds are almost always smaller in size than seeds or grains of the cash crop. In a chaffer or top sieve, adjustable perforations allow grain to penetrate. The top sieve typically oscillates to convey material toward the rear of the machine. An air blast from a fan levitates the mat of material to be sorted and the air flow blows away the light chaff, and also typically, weed seeds. Underneath the top sieve is the lower sieve, which is very similar but has smaller openings. It also oscillates and uses an air blast from a fan to separate grain from chaff. Any material that passes through this lower sieve should be clean grain or cash crop. Any material that passes through the chaffer but not the sieve will go into the tailings return or out the back of the combine. This material, MOG (Material Other than Grain) is spread back on the land/field, and can include light chaff, stalks, pods, cobs, and other plant or non-plant material and notably—weed seeds.

Seed shatter figures importantly in weed seed dynamics. Seed shatter is the percentage of seeds that drop from a weed plant prior to harvest. Weed seed shatter research has shown high retention rates of weed seeds at harvest. Many weeds (such as wild mustard, foxtail, and ryegrass) retain 70% to 99% of seeds. Therefore, for many crops and weeds, a change of state for weed seeds in a harvest to lower germination viability will be effective at reducing weed seedbank levels and controlling weeds. In this sense, there is huge unmet need for reducing the weed seed bank by reducing germination viability.

For further information on combine harvesters, see [REF 3: Combine Harvesters: Theory, Modeling and Design, Petre Miu, CRC Press, Boca Raton, Florida, ©2016, hereby incorporated in this disclosure in its entirety].

Seed Mechanical Destructor Prior Art

One recent development has been introduction of the mechanical seed destroyer or seed impact mills, or alternatively, seed control units, which act as a mechanical destructive process to impair the ability of seeds to later germinate after they are discharged upon an agricultural field. These are generally cage mills that are retro-fitted to the rear of a harvester combine. Such seed control units are manufactured by REDEKOP, Saskatoon, SK, Canada, and others. The Harrington Seed Destructor, by Raymond B Harrington of Cordering, Australia, disclosed in U.S. Pat. No. 8,152,610 to Harrington (Assignee: Grains Research and Development Corporation, Barton, ACT, AU) teaches fragmentation in a cage mill to damage and render useless weed seeds that would otherwise be discharged during harvesting onto a field. This solution is shown using a follow-on vehicle, has high power requirements of 45 kW to ~80 kW, and suffers from operational problems such as machine sensitivity to soil, sand, and straw from the combine output causing excessive mill wear, and operationally, an increase in fine dust from the mills resulting in reduced operator visibility, as well as increased maintenance costs, and increased fire risk due to high levels of fine dust generated. There are also flow issues in the destructor at times, as they are hard-driven to process high amounts of material in an effort to obtain substantial reductions in germination viability for the weed seeds.

Reference is now made to US Patent Application Publication 2022/0008889 ("Jackson '0008889"), application Ser. No. 16/923,079 to Jackson et al., filed 7 Jul. 2020. The entire disclosure of this prior issued patent publication 2022/0008889 to Jackson et al. is hereby incorporated herein by reference in its entirety and its subject matter arises from the same owner and obligation to assign. In Jackson'0008889, FIGS. 59 and 60 depicted therein show seed destruction mills for treating harvest, including weed seeds. Such a unit could be, for example, the Harrington Seed Destructor, alluded to above, disclosed in U.S. Pat. No. 8,152,610 to Harrington; or the seed destruction mill disclosed in U.S. Pat. No. 10,004,176 to Mayerle. In such mills, flow of harvest tailings into the mill allow that tailings meet a destruction process. One arrangement employs a housing containing two concentric rotors that are mutually counter-rotating, both driven at high rotational speed that subjects weed seeds to destructive stresses to cause damage to lower their germination viability. As can be seen in the description for FIG. 28 below, high applied energy (and accompanying noise, wear, dust, and maintenance costs) must be marshaled to obtain high reduced seedling emergence in tests (low germination viability).

An improved arrangement is disclosed in Jackson '0008889 is an illuminated seed destruction mill where a seed destruction mill comprises inside or near its housing various possible illuminators and associated processing or exposure theaters, to treat a harvest tailings load. Inward tailings flow allows that harvest tailings can enter an illumination unit that comprises multiple illuminators and associated processing theaters at or inside the seed destruction mill at various locations. These illumination units can be located at the entrance, output end, or internal locations in the mill. This can increase the statistical success of the seed destruction mill advantageously by following the mechanical mill process with an optical one, as taught and claimed in Jackson '0008889 disclosure.

However, the illuminated seed destruction mill disclosed in Jackson '0008889 is not a hybrid complementary process that allows high achievement of reduced germination viability, low applied energy, low noise and dust levels, and superior treatment of impact-resistant seeds like *Bromus tectorum*.

Jackson '0008889 discloses that regarding soil irradiation to lower germination viability of seeds already in the ground, U.S. Pat. No. 6,401,637 to Haller discloses soil irradiation with microwaves. Our lab tests have shown this technique does not work. Microwaves have poor penetration into soil, and a very long time is required to heat up both the soil and any weed seeds. Also, microwaving seeds directly took longer in our lab tests, did not achieve workable and practical seed sterilization. Weed seeds in soil can quickly sink deeper into the soil after a rain.

Others have attempted to use heat to destroy weed seeds. While cooking a weed seed to high temperatures will render it useless, wholesale heating of tailings is time-consuming and expensive and not practical given the large masses involved. In a prior art technique called solarization, sunlight and dark-shielding materials laid out on the ground are used to trap heat and elevate soil temperatures. Solarization is also time-consuming, and can take hours, working under ideal conditions, and there is the unaddressed question of substantial thermal mass of weed seeds shorn from the weed plants to treat from a typical combine process during operation. See [REF 4: Weed Science 2007 55:619-625 Time and Temperature Requirements for Weed Seed Thermal Death, Ruth M. Dahlquist, Timothy S. Prather, James J. Stapleton].

Some have attempted to use exhaust heat from a combine harvester to treat weed seeds. Such methods are time-consuming, cumbersome to effect, and ineffective. In one reference, temperatures of 75-85 C were insufficient to significantly reduce germination of seeds after three exposure durations. See [REF 5: Killing Weed Seeds with Exhaust Gas from a Combine Harvester, September 2019, Klaus Jakobsen, Jakob A. Jensen, Zahra Bitarafan, Christian Andreaen, Agronomy (received 16 Aug. 2019) DOI: 10.3390/agronomy9090544].

Oxidative signaling can influence seed germination. Reactive Oxygen Species (ROS) affect events in seed life and may play a role in regulating cellular growth. It is now known that the chemical group $O_2-$ plays a role in cell death. ROS may play a role in seed signaling, but ROS signaling transduction pathways in a seed are not fully understood. See [REF 6: Oxidative signaling in seed germination and dormancy, Hayat El-Maarouf-Bouteau and Christophe Bailly, Plant Signal Behav. 2008 March; 3(3): 175-182. doi: 10.4161/psb.3.3.5539 PMCID: PMC2634111 PMID: 19513212].

Reducing germination viability of weed seeds depends on many and varied biologic and environmental factors, including plant species, condition, type, moisture content, environmental history, solar insolation, weather, and varied actions of insects, animals and microbiotica.

Generally, seeds are special, being relatively robust, with significant water content, such as 18% water content, and they typically possess an outer protective shell. Seeds can sit 20 years in dry soil before germinating. Indeed, weed seeds are difficult to make unviable as they can stay viable even after having been in soil for decades. Some seeds have remained viable for 1600 years. Reports show a typical 40 years of viability even after residing in the soil, through temperature changes and the heaving and thawing of that soil. Some seeds possess hard shells on the outside (the seed coat) that help preserve them from damage. Seed mechanical destructors that use a mechanical destructive process are able to impair the ability of these seeds to germinate.

Now referring to FIG. 1, a schematic representation of a general electromagnetic spectrum for wavelengths of radiation of significance that are potentially incident upon a plant, with wavelengths ranging from 1 mm to less than 100 nm, is shown. In the infrared portion, or heat radiation portion of the electromagnetic spectrum, there are subdivisions for Far-Infrared (FAR), mid or Medium Wavelength Infrared (MWIR) and near-infrared (NEAR) all in total ranging from 1 mm to 700 nm or 0.7 microns. Visible light (Visible Ught) is commonly taken to range from 700 nm to 400 nm. Ultraviolet (Ultraviolet) radiation is generally taken to be of wavelength less than 400 nm, with near-ultraviolet further divided according to some consensus into known portions UV-A (400-320 nm), UV-B (320-280 nm) and finally, UV-C (280 nm-100 nm) which is extremely dangerous for humans and is often used as a germicidal radiation to purify water and kill bacteria, viruses, and other organisms.

There are competing standards for labeling portions of the electromagnetic spectrum, as promulgated by ISO (International Organization for Standardization); DIN (Deutsches Institut für Normung e.V). (German Institute for Standardization) and others.

It is important to note that in this disclosure and the appended claims, these and certain other subdivisions shall have particular meanings assigned here and will be defined herein in the Definitions Section.

Now referring to FIG. 2, a cartesian plot of both unfiltered solar radiation and net (ground) solar radiation is shown, with spectral radiance in watts per square meter per nanometer versus wavelength in nanometers (nm) is shown. Photosynthesis in plants makes use of visible light, especially blue and red visible light, and ultraviolet light, to varying degrees, depending on a host of factors including plant species and type, radiation exposure history, chloroplast type, internal plant signaling, light exposure history, and other factors. Note that nearly all the natural infrared radiation in sunlight is essentially in the region in or about near infrared (NIR), with wavelength shorter than 2 micrometers. This is in contrast to the unnatural illumination taught and claimed in the instant disclosure.

Approximately seven percent of the raw electromagnetic radiation emitted from the sun is in a UV range of about 200-400 nm wavelengths. As the solar radiation passes through the atmosphere, ultraviolet or UV radiation flux is reduced, allowing that UV-C ("shortwave") radiation (200-280 nm) is completely absorbed by atmospheric gases, while much of the UV-B radiation (280-320 nm) is additionally absorbed by stratospheric ozone, with a small amount transmitted to the Earth's surface. Solar UV-A radiation (320-400 nm) is essentially, for practical purposes, not absorbed by the ozone layer. As mentioned below, UV-B and UV-C radiation have been suggested to effect eradication of plants.

Plants tend to respond to UV-B irradiation and also to excessive visible light by stimulating protection mechanisms or by activating repair mechanisms to reduce injury and perform repair.

Reference is now made to U.S. Pat. No. 8,872,136, issued 28 Oct. 2014 to Jackson, et. al., application Ser. No. 13/553, 797. The entire disclosure of this prior issued U.S. Pat. No. 8,872,136 to Jackson et al. is hereby incorporated herein by reference in its entirety and its subject matter arises from the same owner and obligation to assign.

Reference is also made to U.S. Pat. No. 10,344,022 to Jackson et al., application Ser. No. 16/166,129. The entire disclosure of this prior issued U.S. Pat. No. 10,344,022 to Jackson et al. is hereby incorporated herein by reference in its entirety and its subject matter arises from the same owner and obligation to assign.

In U.S. Pat. No. 8,872,136 to Jackson et al., a substantially non-invasive low-energy low irradiance non-mutating method is taught and claimed for eradicating a plant in a time under one minute, using a Rapid Unnatural Dual Component Illumination Protocol (RUDCIP) with illumination about the plant—but a different method is given from that disclosed and claimed in the instant disclosure—different aiming, different wavelengths, and different protocols are given.

Jackson U.S. Pat. No. 8,872,136 discloses an aimed above-ground foliage and root crown damage illumination component comprising exposure using near-IR radiation directed to the foliage of the plant and/or its root crown—along with an aimed ground-penetrating UV-A illumination component, with UV-A radiation directed to the root crown of the plant and/or the soil grade immediately adjacent the root crown of the plant.

In the U.S. Pat. No. 10,344,022 to Jackson, et al., Ser. No. 16/166,129, two different aimed radiations are applied: an Indigo Region Illumination Distribution to be directed to plant foliage and/or a plant root crown, and a Medium Wavelength Infrared distribution of light, to be directed to the ground, to a plant root crown and/or soil immediately adjacent the root crown. The research was fast moving, somewhat unpredictable, and revealed that making weed seeds unviable—as opposed to plants—was fraught with counterintuitive results, and the illumination protocol taught and claimed here in the instant disclosure is a different one, superceded by new discoveries taught and claimed here. The illumination teaching of this disclosure is not aimed, uses different energies, a different protocol, and the use of an Indigo Region Illumination Distribution is, strictly speaking, not required, as can be seen in the appended claims. It is counterintuitive that a gentle process would work while more intense methods that might crack or damage a seed coat might not, which is suggested in the prior art by the practice of scarification, the weakening or opening of the coat of a seed to assist germination. The teachings and claims of the instant disclosure are drawn to a different problem, involving a different stage of plant life, and achieving a change of state to having reduced viability in a safe, low energy, practical manner, in the presence of chaff and confounding materials in a stream of agricultural tailings, as discussed in the specification below.

OBJECTS OF THE INVENTION

Accordingly it is a broad aim of this invention to make weed seeds unviable when those weed seeds are gathered or harvested in grain production, such as in a harvester combine, surrounded by chaff and debris and confounding materials.

It is another object of this invention to allow for treatment fast enough not to substantially slow down the operation of a harvester combine, that may be generating a high mass of tailings.

It is another object of this invention that weed seeds can be made unviable under typical field operating environments, and in the presence of confounding materials also collected at harvest under high speed operation.

It is yet another object of this invention to operate below combustion temperatures so as not to start a flash fire, such as in the interior of a combine, rendering it destroyed.

Other objects of this invention not given above will become clear from further reading of the specification.

SUMMARY OF THE INVENTION

The invention comprises a hybrid complementary process where a mechanical destructive process and an illumination process can occur independently, but the mechanical destructive process is modified to have a different driven load flow. The invention allows reduction of viability for germination prior to discharging weed seeds back onto an agricultural field, reducing the weed seed bank and it uses a combination of irradiances.

The invention can be used as a tool to combat herbicide-resistant weeds, and it can be used to equip multi-class combines to reduce weed seed viability during harvest operations, within a tight harvest window or time range.

The invention comprises a hybrid beneficially complementary twin process to operate upon impact-resistant seeds that are part of a harvest tailings load, to induce a change of state in the impact-resistant seeds to having reduced germination viability in a time under one minute, the twin process comprising:

[1] a mechanical destructive process so constructed, sized, and operated [a] to be operable upon the harvest tailings load and upon the impact-resistant seeds, and [b] to generate forceably a driven load flow in the harvest tailings load, the driven load flow so formed to increase capability of exposure of the impact-resistant seeds to an illumination process, above a capability of exposure obtained without the driven load flow;

[2] the illumination process operable upon the driven load flow in the harvest tailings load, and so constructed, sized, oriented, focused, aimed, energized and operated to act upon the impact-resistant seeds

[a] sufficiently to allow illumination to achieve a minimum of at least one of 2 Joules/cm$^2$ cumulative illumination energy, and 0.2 W/cm$^2$ irradiance, but no more than 7 W/cm$^2$ average irradiance, of a light wavelength distribution comprising at least one of an Indigo Region Illumination Distribution (IRID) and infrared radiation that is substantially Medium Wavelength Infrared (MWIR)) radiation, and

[b] sufficient, along with the increased capability of exposure, to allow illumination to create a twin process harvest tailings load discharge that possesses a lower germination viability than if created without the illumination process energized.

The driven load flow can be further formed to provide at least one of rarefaction, randomization, and circulation of the harvest tailings load to further increase the capability of exposure.

The mechanical destructive process and the driven load flow can be formed to randomize the harvest tailings load by at least one of mixing and decreasing material density of the harvest tailings load.

The mechanical destructive process and the driven load flow can be formed to rarefy the harvest tailings load by action of an increase in at least one of a driven load flow manifold (M) volume increase and driven load flow manifold width.

The mechanical destructive process and the driven load flow can be further so constructed and operated to allow a circulation for a part of the driven load flow that causes some of the impact-resistant seeds to make two or more iterations under operation of at least part of the illumination process.

The mechanical destructive process can be underdriven by not being operated to achieve a higher possible process efficacity that would be obtained under at least one of: [a] a greater applied mechanical power, [b] a longer mechanical dwell time for the impact-resistant seeds, [c] a lower flow throughput for the harvest tailings load discharge, and [d] a lower harvest tailings driven load flow.

The mechanical destructive process is under-driven with the applied mechanical power down at least forty percent, or down twenty percent from what would be required to achieve a higher possible process efficacity.

The mechanical destructive process can be so formed and operated to provide for an exposure time of the impact-resistant seeds of under ½ second, or under 1 second, or under 2 seconds.

The mechanical destructive process can be so formed and operated such that the illumination process is operable upon the driven load flow while it is in motion, or while it is substantially stationary.

The invention also comprises a harvest tailings mill using a hybrid beneficially complementary twin process to act upon a harvest tailings load containing impact-resistant seeds, the harvest tailings mill comprising:

[1] a process housing adapted and constructed for accepting the harvest tailings load containing the impact-resistant seeds, and so designed to allow during operation a driven load flow therein;

[2] a rotor so sized, shaped, bearingly retained and powered to perform a mechanical destructive process upon the impact-resistant seeds introduced via the harvest tailings load in the process housing;

the process housing and the rotor so further constructed, sized, and operated to generate forceably the driven load flow in the harvest tailings load, such that the driven load flow is so formed to increase capability of exposure of the impact-resistant seeds (S) to an illumination process, above a capability of exposure obtained without the driven load flow;

[3] an illuminator operable upon the driven load flow, and so constructed, sized, oriented, focused, aimed and operated to act upon the impact-resistant seeds to allow illumination access

[a] sufficient to allow illumination to achieve a minimum of at least one of 2 Joules/$cm^2$ cumulative illumination energy, and 0.2 W/$cm^2$ irradiance, but no more than 7 W/$cm^2$ average irradiance, of a light wavelength distribution comprising at least one of an Indigo Region Illumination Distribution (IRID) and infrared radiation that is substantially Medium Wavelength Infrared (MWIR)) radiation, and

[b] sufficient to allow illumination to create a twin process harvest tailings load discharge that possesses a lower germination viability than if created without the illumination process energized.

The hybrid twin process can have the driven load flow further formed to provide at least one of rarefaction, randomization, and circulation of the harvest tailings load to further increase the capability of exposure. The mechanical destructive process and the driven load flow can be formed to randomize the harvest tailings load by at least one of mixing and decreasing material density of the harvest tailings load. The mechanical destructive process and the driven load flow can be formed to rarefy the harvest tailings load by action of an increase in at least one of a driven load flow manifold (M) volume increase and driven load flow manifold width.

The mechanical destructive process and the driven load flow can be further so constructed and operated to allow a circulation for a part of the driven load flow that causes some of the impact-resistant seeds to make two or more iterations under operation of at least part of the illumination process. And the mechanical destructive process can be so formed and operated to provide for an exposure time of the impact-resistant seeds of under 1 second, or under 2 seconds.

BRIEF DESCRIPTION OF THE DRAWINGS

FIG. 1 shows a schematic representation of a general electromagnetic spectrum for wavelengths potentially incident from the sun, with wavelengths ranging from 1 mm to less than 100 nm;

FIG. 2 shows a typical natural filtered and unfiltered solar radiation spectrum using a cartesian plot of spectral radiance versus wavelength;

FIG. 3 shows a schematic representation of a process according to the invention to induce a change of state of seeds or weed seeds to having reduced germination viability using a dual component illumination protocol shown schematically for two portions of the electromagnetic spectrum as shown in FIG. 1 being directed upon seeds resting upon a surface;

FIG. 4 shows a close-up view of the bottom portion of FIG. 3, showing incident rays for an Indigo Region Illumination Distribution and a Medium Wavelength Infrared illumination distribution aimed at a seeds in a harvest tailings load under transport by a moving belt in a processing theater;

FIG. 5 shows a schematic of a tailings conversion process according to the invention, whereby either or both of Medium Wavelength Infrared and light from an Indigo Region Illumination Distribution are used to induce a change of state to reduced germination viability to one or more seeds directly;

FIG. 6 shows an illustrative weed seed accumulator belt that comprises pores or the like;

FIG. 7 shows a transmissive weed seed accumulator belt for use in a processing theater according to the invention;

FIG. 8 shows a schematic representation across the range of 300 nm to 550 nm for an Indigo Region Illumination Distribution, with various illustrative possible distribution patterns:

FIG. 16 shows a schematic compilation of qualitative seed/floret characteristics under a treatment by a mechanical destructive process, including physics of impact and relative applied power for efficacity;

DEFINITIONS

Figure 1:
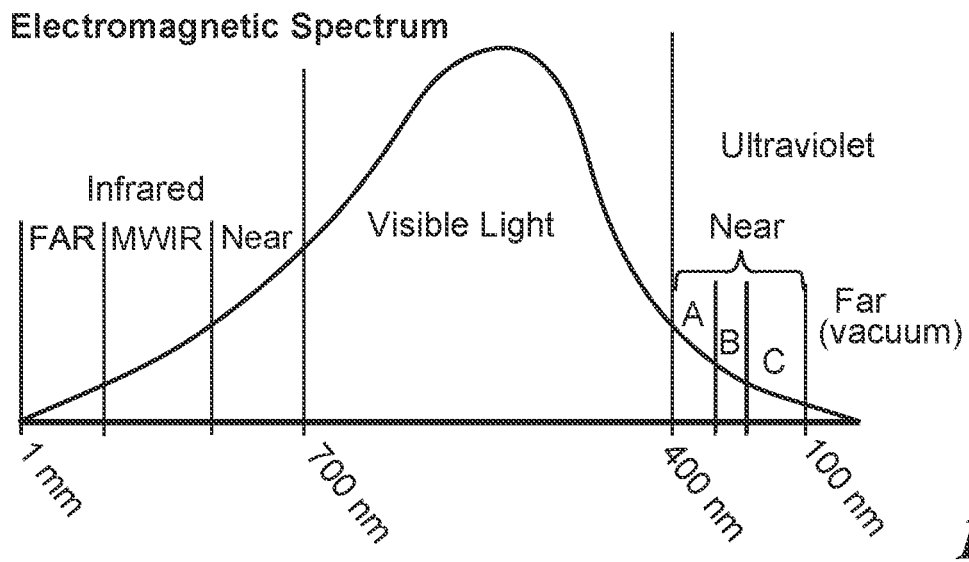
Figure 2:
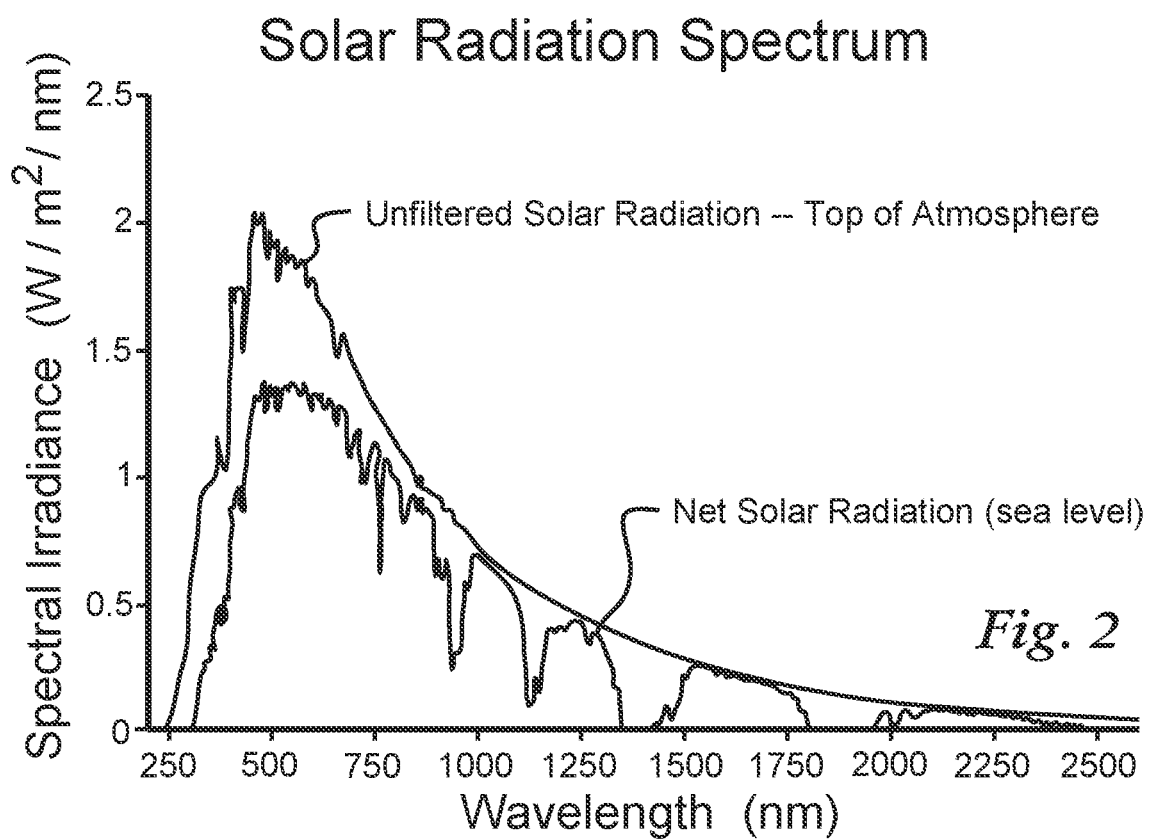

The following definitions shall be used throughout:

Applied power—shall denote especially applied power (kW or equivalent) used in a mechanical destructive process according to the invention, including destructive processes and for generating a driven load flow.

Auger—shall include any helical component that effects movement of material, and any component that accomplishes the same function. A spiral-shaped component is not necessary and nor is a spiral path.

Belt—shall include any structure or material body that can serve as a web, conveyor, or transporter to facilitate illumination according to the invention. A belt that forms a processing theater can serve as a weed seed accumulator as defined here, and can itself also act as a radiator or transmitter of electromagnetic radiation.

Capability of exposure—shall denote the ability to successfully illuminate, such as afforded by a relatively direct line-of-sight via a relatively low path length through chaff in a harvest tailings load to an impact-resistant seed; and such as a long (typically transverse) seed path length of the impact-resistant seed past an illuminator for affording greater opportunity for exposure, and greater time-of-exposure. This will involve generally intentional geometrical formation of driven flow in relation to illuminators used in the illumination process.

Circulation—shall denote a transit path for an impact-resistant seed that allows for capability of exposure and does not have to imply a complete circular or quasi-circular arc or revolution, and does not have to imply two or more visits past an illuminator.

Coat/seed coat—shall denote casings, or other plant material surrounding a seed.

Combine—shall be any machine that reaps, threshes and separates a harvest, as defined herein.

Chaff—shall include any of dry, scaly, or protective casings or coverings of seeds, such as parchment or endocarp-like coverings, husks or bracts; scaly parts of flowers; straw or finely chopped straw, and husks, stems, other debris connected to a plant, crop, foodstuff or harvest as defined here; and can also include stems, grass, leaves, sticks, heads of plants such as wheat head; attached soil, and field debris.

Change of state to having reduced germination viability—shall connote primarily a statistical attribute, namely, a decrease in the percentage of seeds capable of later producing growing plants for a given set of environmental conditions.

Directed, directing—shall denote any net transmission of electromagnetic radiation as taught and claimed here, whether by direct illumination or via reflection or indirect transmission, such as via use of mirrors, light guides, via refraction, or incidental reflection or absorption and re-transmission through any material body, or through a chaff under treatment, or a seed adjacent to a seed under treatment, such as light passing between or through one or more seeds to another seed.

Field—shall include any agricultural surface, whether outside or inside a greenhouse or growing facility, and also any surface, volume or place upon which the instant invention is practiced.

Driven load flow—shall denote a harvest tailings load flow that has set in motion by or forced by a mechanical destructive process, such as a load flow driven by a rotor or plate in motion or via moving air. The driving of the load flow can be in whole or in part driven separately by another means than any rotor. The driven load flow can comprise translational motion, vibrational motion, rotary motion or other motion imparting force to same. A driven load flow can be at times stationary, and can include piecewise, intermittent or toggled flows. A driven load flow in this disclosure can be proximate the rotor of the mechanical destructive process as illustratively shown here, or not proximate the rotor, or not caused in whole or in part by any rotor. A driven load flow can employ suction as well as pressure, or movement imparted by impellers or vanes and the like, or be supported by gravity or a gravity-fed flow.

Driven Load Flow Manifold—shall denote any passage or volume through which a driven load flow passes. This can include, but does not have to include a processing theater or exposure theater, as defined here.

Driven Load Flow Manifold Width—shall denote a cross-sectional width or cross-sectional area at a given portion of a driven load flow manifold and can change as a driven load flow manifold passes by an illumination process according to the invention.

Dwell—shall denote the average time that an impact-resistant seed or harvest tailings load spends in a mechanical destructive process or an illumination process according to the invention before exiting. It can comprise any equivalent, or somewhat equivalent, parameter.

Exposure time—in the instant specification and appended claims, shall mean a process of illumination that can comprise any combination of stepwise, piecemeal, segmented, separated, sequential, variable, or modulated exposures that when totaled, have a summed duration or the equivalent of what is specified. A two second exposure can be delivered using four ½ second flashes, and a three second exposure can be delivered in two 1½ second exposures. Individual flashes or exposures can happen in different places, and by different illuminators. Flashes or exposures can be conditional, such as being dependent on conditions (e.g., moisture content) of a harvest tailings load, or being dependent of the type of harvest tailings load (e.g., cash crop and weed seed populations by species).

Germination viability—in this disclosure shall can be expressed as, and shall denote, unless otherwise stated, the statistical percentage of seeds capable of later producing growing plants for a given set of environmental conditions, and a given set of operating conditions of a mechanical destructive process and/or an illumination process as alluded to herein. Germination viability shall refer to a statistical measure across one seed or any number of seeds that are treated according to the invention. It can be expressed illustratively as a percentage of treated seeds that are able to germinated, or that have been observed germinated after seed testing. If eighty percent of seeds after treatment according to the invention are not able to germinate, that corresponds to twenty percent germination viability.

Harvest—shall denote any agricultural product or biological material treated using the teachings of the invention, such as a harvest on a field or any reaping of live plants, whether considered a foodstuff or not; and also any biological product or material arrayed for treatment according to the instant invention. Harvest, as defined here, shall also include any agricultural product or crops or plants that have been reaped, cut, rolled, burned, tamped, shredded, or otherwise manipulated or treated by means other than by use of the instant invention.

Heater/Heating—shall include all thermal production and transfer, from any heat source, via contact or conduction; convection; or radiation.

Higher possible process efficacity shall refer to a process efficacity (as defined herein) that would be obtained if a mechanical destructive process were designed, and operated, to run in a different operating regime, with a resultant lower germination viability.

Illumination—shall be interpreted broadly and shall include all manner of radiative processes as defined by the appended claims, and shall not be limited to lamp outputs, but rather shall encompass any and all radiation afforded by physical processes such as incandescence or any light emission process such as from a light emitting diode (LED); flames; or incandescence from hot masses, such as gases, fluids, steam, metal knives or hot infrared emitters—and can encompass multiple sources. Lamps shown illustratively in this disclosure shall not be considered limiting, in view of the appended claims.

Illuminator—shall denote any light sources as taught or suggested herein for practicing the instant invention.

Impact-resistant seeds—shall be any plant seeds which are resistant in some way to treatment by a particular mechanical destructive process in use according to the invention, in that [a] statistical or overall germination viability for such treated seeds is greater than zero percent probability after such mechanical destructive process treatment, for example, 0.7, 1.2, 3, 8, or 11 percent seed germination viability, or alternatively, [b] after such treatment, there is reduced seedling emergence of less than 100 percent, i.e., there is germination of some treated seeds. This can originate in part from seed mill operating parameters such as input power and revolutions per minute and this definition shall apply to this disclosure and the appended claims.

IRID/Indigo Region Illumination Distribution—shall denote a preferred range of frequencies, such as emitted by commercially available blue LED (light emitting diode) light sources with emission peaks named "royal blue" that denote a possible range of wavelengths that serve the instant invention. This definition shall include an Indigo Region Illumination Distribution to be defined to be any of the following wavelength ranges:

[1] A preferred range: 420-450 nm; [2] a larger preferred range of 420-480 nm; [3] a larger preferred range of 400-500 nm; [4] a yet larger preferred range of 400-550 nm; [5] and a broad range of 300-550 nm. This "indigo band" does not have to include indigo or blue or any particular "color" and does not have to include wavelengths in the preferred range of—wavelengths of 420-450 nm that are commonly assigned to indigo or near indigo as human perceptions. The addition of light for any reason, including for a trademark or appearance effect, e.g., aquamarine, shall not affect this definition. An Indigo Region Illumination Distribution IRID can include monochromatic, multichromatic frequency/ wavelength lines or bands, continuous or non-continuous distributions, and distributions that comprise one of more emission lines, or distributions that are absent the general wavelength or frequency for which it is named, i.e., a distribution that is absent wavelengths generally given for indigo, that is, absent approximately 420-450 nm. Metamerism and the response of the human visual system to identify or form color perceptions shall not narrow this definition.

IRID Emitter (88)—shall denote any light producing device that has the requisite electromagnetic output properties to help produce an Indigo Region Illumination Distribution IRID that allows service to the instant invention as described in the appended claims, and can be an LED array IRID emitter 88, a laser, or an excited material body. An IRID emitter and a MWIR emitter can be combined into one body or component, or device.

Mechanical destructive process—shall denote any mechanical process that upon application to a seed in a harvest tailings flow, can impair the ability of that seed to germinate or develop into viable plant. It shall include seed or chaff mills such as the method taught by U.S. Pat. No. 8,152,610 to Harrington and it can include use of other types of mechanical mills that employ rotors, rotors in proximity to stators, translational elements, or reciprocating elements. A mechanical destructive process can comprise any impact, shear, compression, grinding or abrasion process, and shall include known fracturing; comminution; direct impact damage or denting or hitting, such throwing a seed or seed material at a wear plate; crushing; scarring; splitting; chipping; poking; pulverizing, tearing, or any combination of damaging mechanical processes, including those that can utilize action of a solid, liquid or gas, such as small stones, water or compressed air. A mechanical destructive process includes any air handling or harvest tailings load handling elements that impart motion to create a driven load flow as defined herein. As discussed in the Description, that driven load flow does not have to be proximate any rotor or active element of the mechanical destructive process.

Mill—shall denote any machine which supports or creates inside of itself or outside of itself a mechanical destructive process as defined herein.

MWIR/Medium Wavelength Infrared—has been variously defined by different international organizational bodies, sometimes using different terms. For example In the CIE division scheme (International Commission on Illumination), CIE recommended the division of infrared radiation into the following three bands using letter abbreviations: IR-A, from 700 nm-1400 nm (0.7 µm-1.4 µm); IR-B, from 1400 nm-3000 nm (1.4 µm-3 µm); and IR-C from 3000 nm-1 mm (3 µm-1000 µm). ISO (International Organization for Standardization) established a standard, ISO20473 that defines the term mid-IR to mean radiation with wavelengths from 3-50 nm. In common literature infrared generally has been divided into near infrared (0.7 to 1.4 microns IRA, IR-A DIN), short wavelength infrared (SWIR or 1.4-3.0 microns IR-B DIN), mid-wavelength (or medium wavelength) infrared at 3-8 microns (MWIR or mid IR 3-8 microns IR-C DIN) to long wavelength infrared (LWIR, IR-C DIN) 8-15 microns to far infrared 15-1000 microns. In this disclosure, throughout the specification, drawings and in the appended claims, MWIR in particular shall have a meaning assigned, and the wavelengths for MWIR shall span from 2-20 microns, and with preferred embodiments in a range of 2-8 microns and sometimes more preferably in a range of 3-5 microns. Source emissions can include emissions from an MWIR emitter E that is formed from materials with known emissivity functions useful in service of the invention, such as known borosilicate glass.

MWIR Emitter (E)—shall denote any glass or material body that has the requisite optical properties or electromagnetic emissivity properties that allow service to the instant invention as described in the appended claims. This can include glass known under the trade name Pyrex® such as borosilicate glass, which is preferred, or Pyrex Glass Code 7740, as well as Pyrex® soda lime glass or other materials, such as aluminum oxide ceramic. Any material body which serves the invention with useful emissivity as an MWIR emitter when stimulated, excited, or heated shall meet this definition. An IRID emitter and a MWR emitter can be combined into one body or component. See US Patent Application Publication 2022/0008889, application Ser. No. 16/923,079 to Jackson et al.

Minute of total operation/time under one minute—shall denote a process of illumination that shall include stepwise, piecemeal, segmented, separated, sequential, variable, or modulated exposures that when totaled, have a summed duration or the equivalent of under one minute, such as four 10-second exposures/flashes over a three minute time, or four ¼ second flashes in one hour.

Motion/in motion—shall include all generally moving states, such as moving states of a harvest, including [1] continuous motion; [2] stepwise motion that can include pauses, starts and stops, or even has reversals— in any combination; and motion induced by vibratory elements or supports that cause a harvest to generally progress, but not always progress, in space.

Non-invasive—shall include the attributes of not requiring stabbing, cutting, striking or significant mechanical stressing, except for contact with hot bodies or hot fluids such as hot gases or steam when used as a thermal equivalent of Medium Wavelength Infrared radiation as taught here.

Possess a lower germination viability—shall mean, regarding a process discharge product, that the germination viability is lower overall, and this can be due to a lower resultant germination viability due to the presence of a seed, or seeds of a given type, such as *Bromus tectorum* (cheatgrass).

Powder coat—shall include any and all coverings, coatings, surface treatments, appliques, and depositions to a surface, including using materials as disclosed, such as borosilicate glass, Pyrex® Glass Code 7740, soda lime glass, aluminum oxide ceramic.

Process—such as referred to in the instant disclosure and appended claims, including referring to a processing theater, can be a process as taught herein that is continuous in time, or non-continuous, including piecewise, piecemeal, stepped, interrupted or delayed application of the methods of the instant invention, and shall also refer to any process for which at least portion of which occurs in real time.

Process efficacity—shall refer to attainment of a particular percentage lowering of germination viability, such as a lowering of germination viability to twenty percent, or a lowering of germination viability to one percent. It is contemplated that the role of a mechanical destructive process and an illumination process each contribute to overall process efficacity, and that the mechanical destructive process can be underdriven to provide by itself, a process efficacity less than it is capable of were it driven at a higher applied energy, etc. See the description for FIGS. 23, 27 and 28.

Processing theater/Exposure theater—shall comprise any physical area, surface, belt, auger, conveyor, panel, web, screen, mesh, volume or space which facilitates, provides for, or allows illumination according to the instant invention and as described in the specification and appended claims, including any wind tunneling region, auger passage, sorting area, staging area, table, accumulator or harvest flow manifold or driven load flow manifold used for processing of a harvest. In this sense, a processing theater can, but does not have to, include a mechanical or physical belt. It can instead comprise an transport area, region, structure, or material body where sorting, collecting, threshing, reaping, parking, consolidating, separating, resting, or landing of a harvest or processing product treatable by the instant invention occurs. The processing theater or exposure theater can also be situated upon, or proximate to, any field as defined in this disclosure.

Randomization/randomization separation shall denote the mixing of impact-resistant seeds to be more uniform in having fewer clumps, masses, concentrations, or less agglomeration, accumulation or wadding or binding— of separate impact-resistant seeds and associated chaff, MOG (Material Other than Grain) and confounding material.

Rarefaction/rarefaction separation shall denote local or widespread reduction in density of harvest tailings flow or impact-resistant seeds in a harvest tailings flow.

Rotor—shall denote structure as shown illustratively in the instant disclosure, or can be any structure . . . any shape or known construction as selected by those of ordinary skill in the art that actively performs or helps perform a mechanical destructive process, including reciprocating elements such as hammers, or vibratory elements and percussive elements. Surfaces can be curved, flat, convex, concave, or resembling a helicoid flighting, or other shape that can possess useful characteristics, such as being able to drive or push a harvest tailings flow.

Seed—shall include any embryonic plants, or encased plant embryos; agricultural products; and any other biological material such as microbiota, animals, fungi, and bacteria that are susceptible to, or treatable using the instant invention in the manner disclosed in the specification and appended claims. This definition shall apply even with assistance from natural processes that weaken seed coats or can otherwise assist with germination, such as sunlight exposure, heat of a fire, moisture exposure or water immersion, history of passing through an animal's digestive tract, or extreme and seasonal swings in ambient natural temperature or natural light levels.

Seed coat—shall include any protective outer coat of a seed, whether continuously covering the seed, or not; and whether it is hard or soft, pliable or hard, peelable or not easily peelable, and whether of uniform thickness, or having thickness bumps or gaps or thin spots.

Seed destruction mill—shall refer to any process or device which damages seeds, including comminution or damage by grinding, pressing, crushing, cutting or splitting, percussive or impact processes, and any processing that pulverizes, reduces to powders, fractures, or otherwise comminutes or damages.

Stator—shall denote any stationary member or set of members (such as arrayed on a ring) that is in service of a mechanical destructive process, such as by providing a surface or member to injure an impact-resistant seed upon impact.

Tailing/tailings/harvest tailings—can include grain, remnant cash crop, MOG (material other than grain), plant ears, husks, stems, straw, weed seeds, and chaff as defined here, and also any other material that remains after any attempted separation of a cash crop or desired grain or seed from other materials, including material associated with volunteer seeds. Tailings can include confounding material as picked up from an agricultural field or treatment area, and can also include any harvest as defined here, and subject to processing according to the instant invention, including any material in an elevator, auger silo, or ground pile.

Throughput—regarding a harvest tailings load shall represent a flow rate for same, expressed in kg/sec or equivalent (e.g., tons per minute) passing through a harvest tailings mill using a hybrid beneficially complementary twin process according to the invention.

Viability/viable—can refer to the capability of a seed of germination under any of suitable, optimum, and suboptimum conditions. Germination is marked by the development of a plant embryo, and subsequent growth. Viability in this disclosure can be expressed as the percentage of seeds capable of producing plants for a given set of conditions.

Weed seed—shall include any seed (as defined in this section), or portion thereof, treated according to the instant invention, including volunteer crop seeds, cash crops, and cover crops, and shall include any internal structures like the embryo, endosperm, and seed coat of such seeds.

Weed seed accumulator—shall include any belt, structure, material body or space that can serve to mechanically retain, support, or transport seeds, that forms a processing theater as defined in this section and throughout this disclosure illustratively. Weed seeds can be in motion across, upon or through a weed seed accumulator and can be retained by same in continuous, intermittent, paused or varied motion. A weed seed accumulator can also accommodate, retain or support chaff without departing from this definition. It is contemplated that an air pressure differential or an air flow can help weed seeds be retained or supported by, and later expelled by, a weed seed accumulator.

DETAILED DESCRIPTION

This disclosure relates to seeds of all types, among them monocotyldons and dicotyledons. Monocotyledons (associated with one seed leaf) and dicotiydons (associated with two seed leaves) differ in early seedling development. In monocotyledons, a primary root is protected by a coating, a coleorhiza, which ejects itself to yield to allow seedling leaves to appear, which are in turn protected by another coating, a coleoptile. With dicotyledons a primary root radicle grows, anchoring the seedling to the ground, and further growth of leaves occurs. Either way, germination is marked by the growth and development of the radicle, and allowing the full development of a healthy plant.

The teachings of the instant invention include specific protocols recommended from the findings of new research that tailor the protocol to seeds of various seed types.

Now referring to FIGS. 3-15, certain fundamentals will be disclosed that formed the discovery and fundamental basis to make possible the instant invention; US Patent Application Publication 2022/0008889, application Ser. No. 16/923,079 to Jackson et al. discloses more information.

Figure 3:
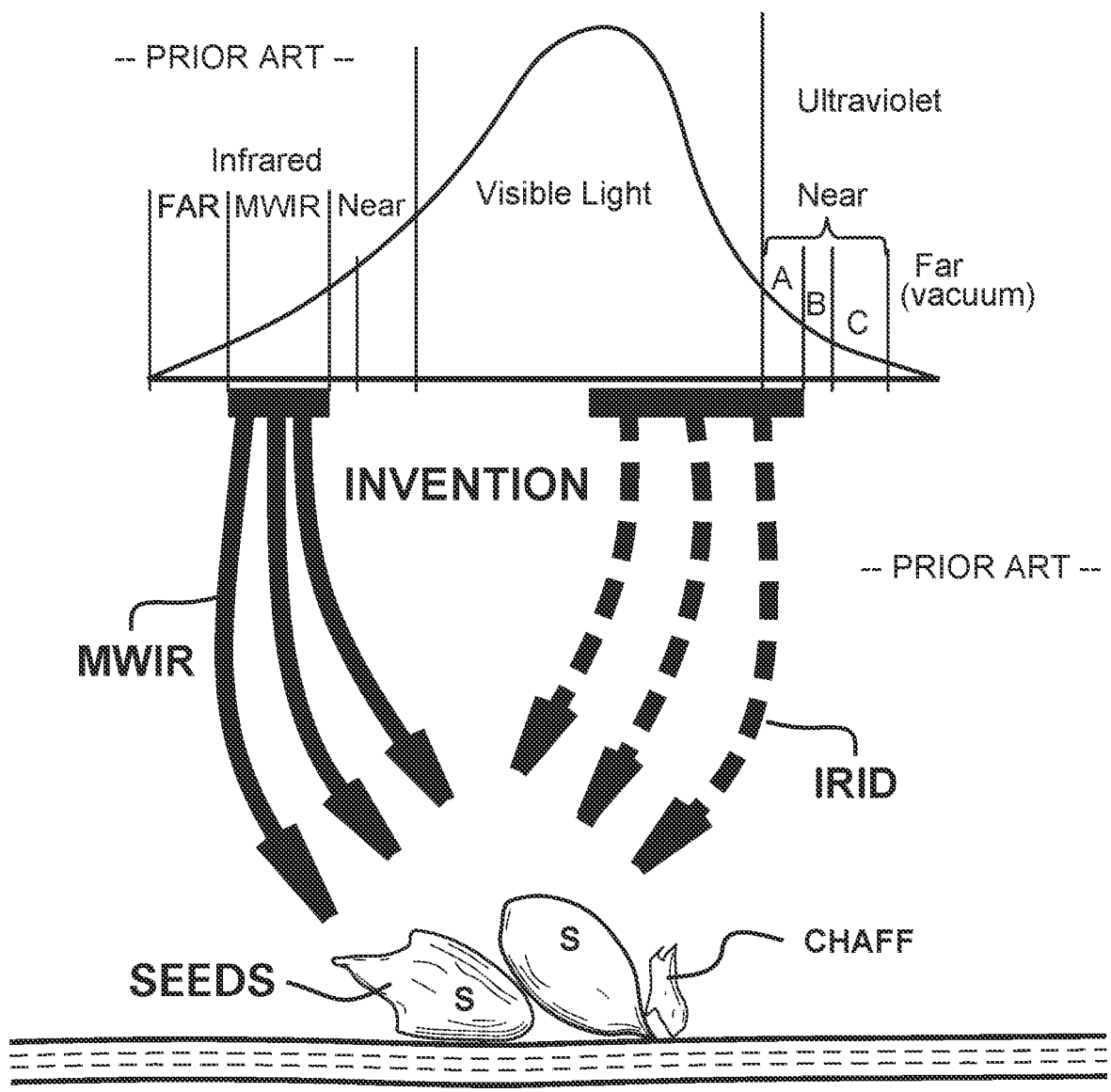

Now referring to FIG. 3, a schematic representation of a process according to the invention is shown using a dual component illumination protocol shown schematically for two portions of the electromagnetic spectrum (as shown in FIG. 1) being directed upon seeds and chaff resting upon any surface, to induce a change of state of those seeds to having reduced germination viability in the statistical sense. The illumination load is shown illustratively as a harvest comprising chaff and other materials together resting upon a belt shown, but the materials can rest upon any surface, such as a ground/earth plane or soil, a stainless steel pan or reflector bed, etc. In this protocol, this high speed, substantially non-invasive, low-irradiance method for changing the state of a seed is accomplished in a time under one minute.

Described very briefly and qualitatively, the method comprises:

[1] illuminating a seed to achieve a minimum of at least one of 2 $J/cm^2$ cumulative illumination energy, and 0.2 $W/cm^2$ irradiance, of a light wavelength distribution comprising at least one of an Indigo Region Illumination Distribution (IRID) and Medium Wavelength Infrared (MWIR)) radiation. As will be discussed below, the protocol calls for an Indigo Region Illumination Distribution containing substantially wavelengths ranging from 300 to 550 nm, preferably 400 to 500 nm; and a Medium Wavelength Infrared radiation substantially composed of 2 to 20 micron wavelength radiation, preferably 2 to 8 microns.

Figure 4:
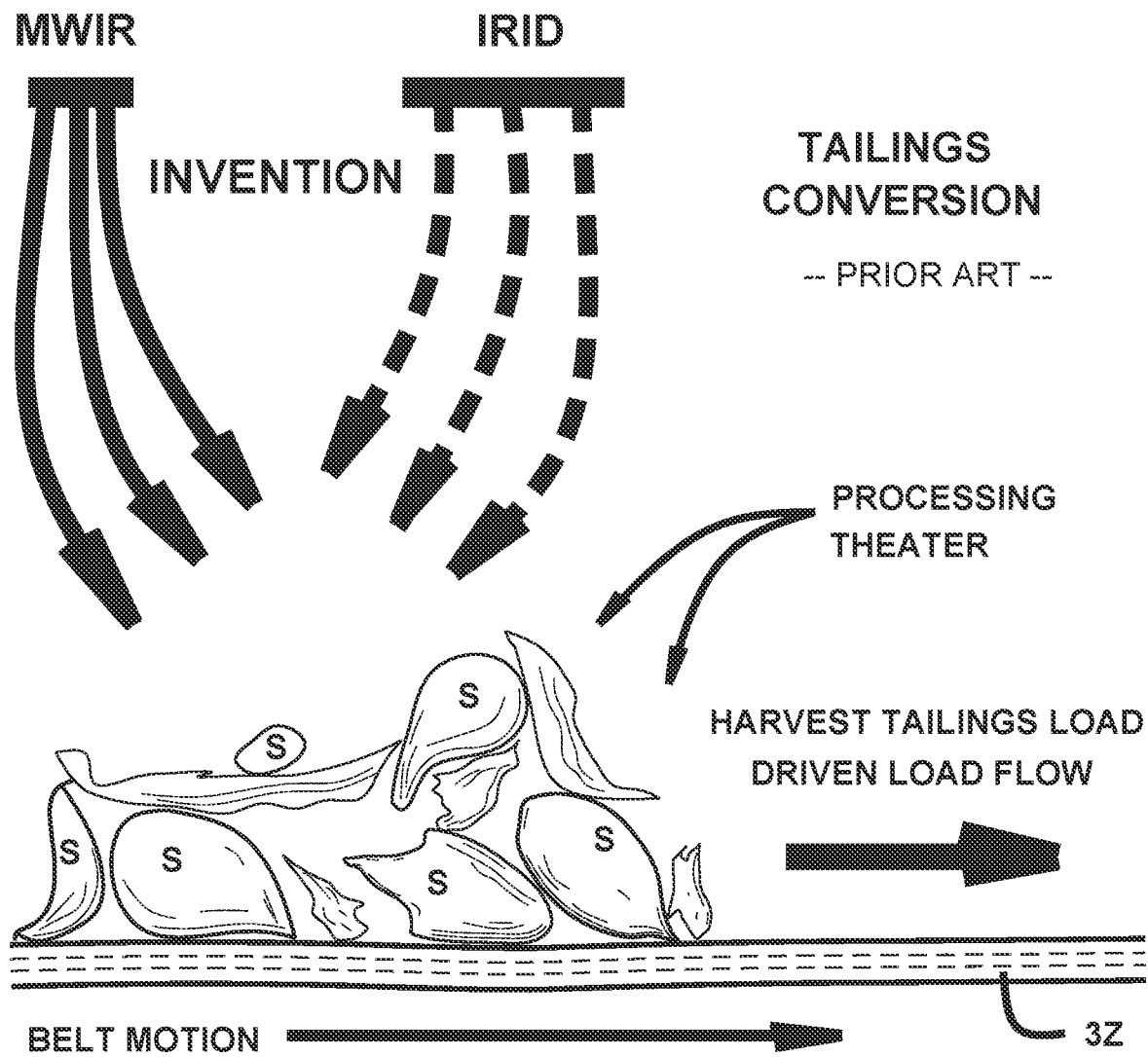
Figure 15:
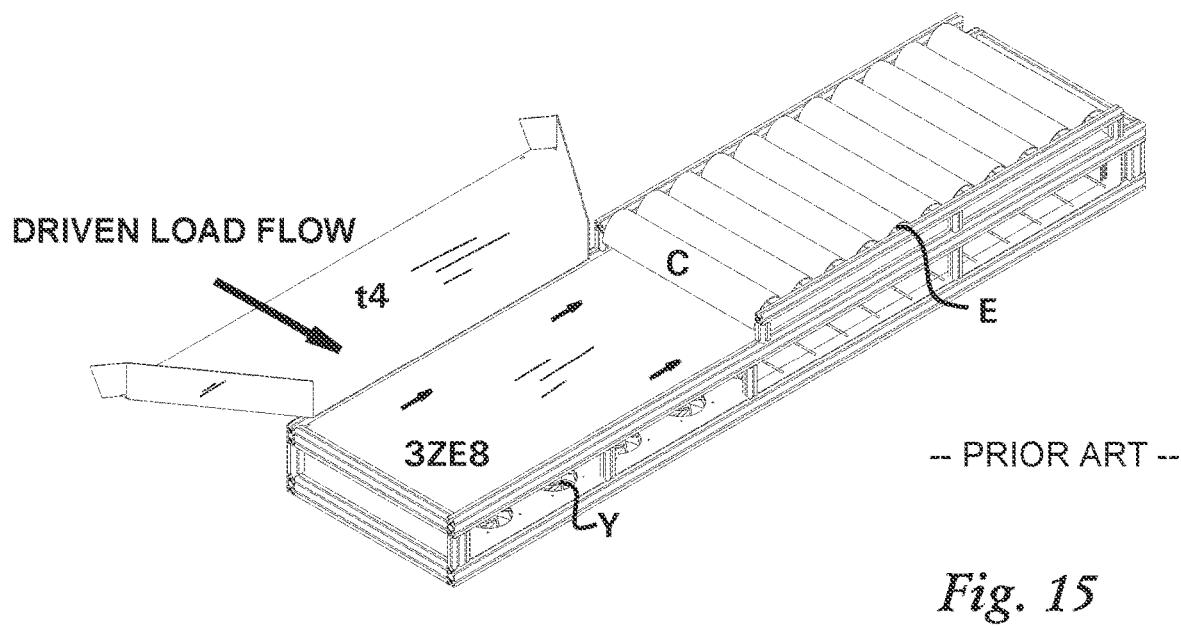

FIG. 4 shows a close-up view of the bottom portion of FIG. 3, showing incident rays for an Indigo Region Illumination Distribution and a Medium Wavelength Infrared illumination distribution aimed at a seeds in a harvest tailings load under transport by a moving belt in a processing theater;

Now referring to FIG. 4, a close-up view of the bottom portion of FIG. 15 is shown, depicting incident rays for an Indigo Region Illumination Distribution and a Medium Wavelength Infrared illumination distribution aimed at the seeds under transport by a moving belt or weed seed accumulator belt 3Z, in a processing theater. This type of illumination protocol is further developed below with specific light source information. The method discovered helps provide a wholesale change, quickly, in the number of seed post-process that successfully germinate and grow.

As seen in the Figure, belt motion (BELT MOTION) effects illustratively a transport of what amount to tailings to the right in the Figure (shown, TRANSPORT) and this process makes it practical for the first time for use in automated equipment such as combines to convert the state of agricultural tailings generally.

Referring now to FIG. 5, depicted is a schematic of the tailings conversion process according to the invention, as shown in FIGS. 15 and 16, whereby either or both of Medium Wavelength Infrared and light from an Indigo Region Illumination Distribution are used to induce a change of state to reduced germination viability to one or more seeds directly. In the Figure, a seed S is shown undergoing after illumination a change of state to having reduced germination viability, represented by S', a "new" seed that statistically, is less likely to germinate when considered among a statistical ensemble of seeds, such as found in the tailings of an agricultural process, or in a grain silo or other container holding seeds.

Now referring to FIG. 6, an illustrative weed seed accumulator belt 3Z or mat that comprises pores or the like is shown. To establish a processing theater to practice the invention—and for materials and tailings handling, generally—such belts have proven useful. A plurality of pores (pore) as shown can act to retain seeds for illumination, and the weed seed accumulator belt 3Z can allow passage of light and air. Ideal mat or belt thickness can be 3-6 mm (⅛" to ¼"), and for reasons given below, the belt itself can be formed from fiberglass, what amounts to Pyrex® glass to great advantage in increased efficacity for the invention itself. The fiberglass belt can be an important part of an illumination unit to effect a change of state of seeds to having reduced germination viability.

Now referring to FIG. 7, a transmissive weed seed accumulator belt 3Z8 for use as a processing theater according to the invention is shown. The Pyrex® or fiberglass belt of FIG. 18 can be illuminated at the underside, allowing Indigo Region Illumination Distribution (IRID) light to pass through it and illuminate a load placed on top, as can be seen in Figures below. Air can also be passed through, for tailing materials handling purposes, such as to attract and later expel a mat of tailings being treated.

Figure 8:
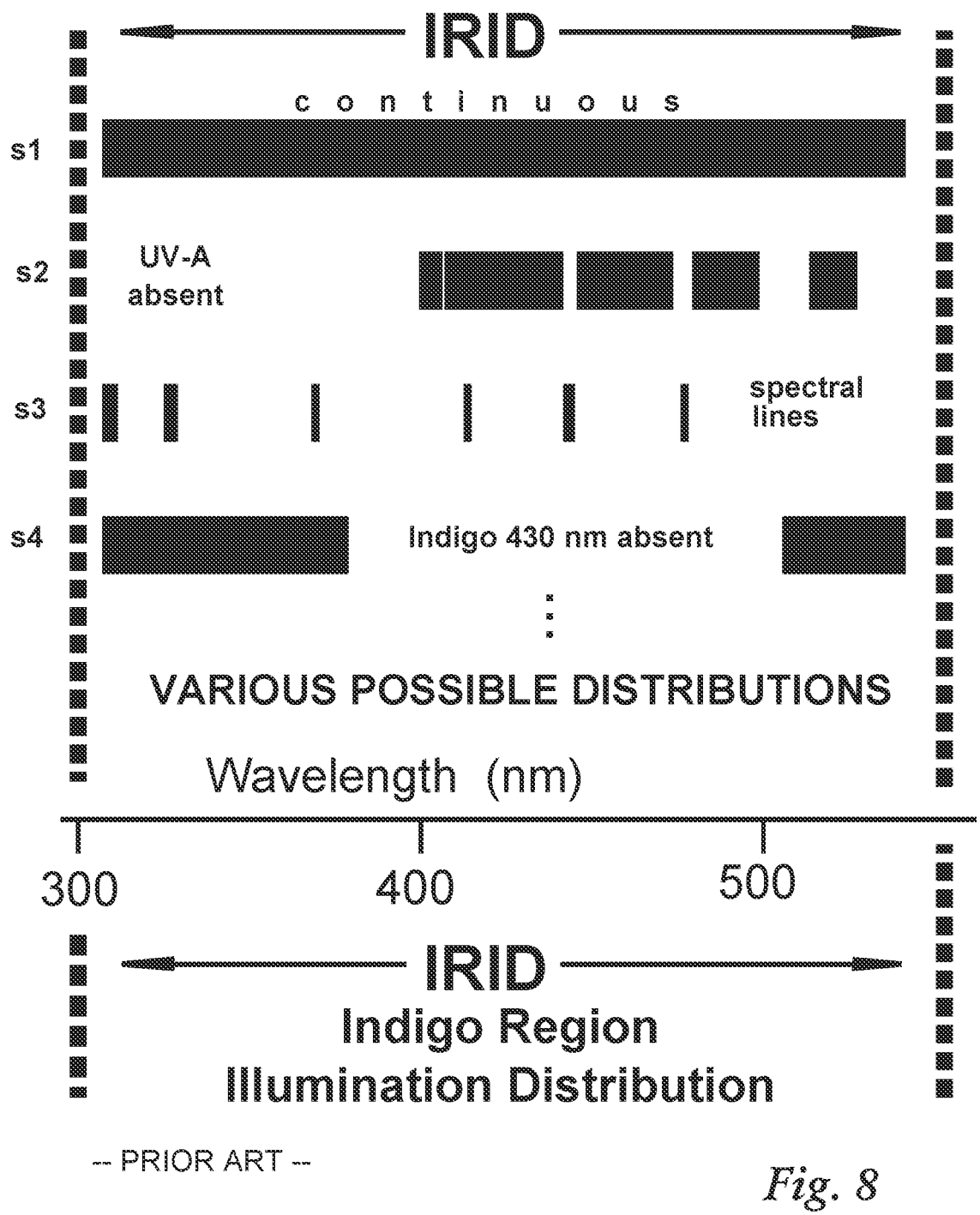

Now referring to FIG. 8, a schematic representation across this range of 300 nm to 550 nm for an Indigo Region Illumination Distribution is shown with various illustrative possible distribution patterns that are possible. This Figure does not show spectral intensity, or spectral irradiance, that is, $W/cm^2$ per unit wavelength—which can vary. The Figure shows only the presence of radiation in particular wavelength, without intensity information.

The first distribution depicted, s1, shows a near full span of the range between 300 and 550 nm, continuous and solid. The second distribution s2 shows another possible distribution from 400 to 550 nn, not continuous and absent UV-A radiation. A third distribution s3 shows various spectral lines of output, with the highest energy radiation at about 480 nm, and consisting of only six emission lines as shown. This can arise from various light sources, such as lasers, and especially ion discharge lamps with no intervening phosphor, etc. A fourth distribution s4 is continuous in part like distribution s1, but is absent mid-wavelengths, and notably is absent wavelengths associated with indigo, for which the Indigo Region Illumination Distribution IRID is named. All these, and other similar distributions are possible in service of the instant invention. However from testing and experimentation, radiation at and around 430 nm appears to be the best for biological effectiveness in weed seed control.

Appearance of the Indigo Region Illumination Distribution IRID to the human eye shall not be indicative of suitability, A Indigo Region Illumination Distribution may not appear "blue" or 'indigo" to the human eye because of the effect of constituent wavelength components—and response of the human eye to light distributions, including known effects of metamerism, shall not limit or narrow the scope of the appended claims, nor narrow the instant teachings.

As stated above, a Indigo Region Illumination Distribution IRID contains wavelengths of light substantially coincident with a short wavelength absorption relative peak (generally of wavelength less than 550 nm) of a grown plant. In the protocol taught and claimed in the instant disclosure, the preferred range of wavelengths for the Indigo Region Illumination Distribution is 400-500 nm, with a distribution centered at about 430-450 nm.

Known commercially available high output "blue" LEDs (light emitting diodes) can be used to provide necessary light for Indigo Region Illumination Distribution IRID, providing light generally in a wavelength range from 400 to 550 nm. For example, known SiC (silicon carbide) based LEDs with output from 430-505 nm (appearance blue) are available and have a Forward Voltage of 3.6 volts; GaN (Gallium Nitride) and InGaN (Indium Gallium Nitride) based diodes are also available. Mixture of GaN with In (InGaN) or Al (AlGaN) with a band gap dependent on alloy ratios allows manufacture of light-emitting diodes (LEDs) with varied output peaks. Some LED devices using Aluminium Gallium Nitride (AlGaN) produce ultraviolet (UV-A) light also suitable for a Indigo Region Illumination Distribution, and known phosphors can be used to extend spectral range or to serve another objective such as making a trademark color splash without departing from the scope of the invention and appended claims.

To construct a Indigo Region Illumination Distribution IRID source, commercially available high power UV/violet LED chips are thus available in varied peak distribution wavelengths such as 365 nm, 370 nm, 375 nm, 385 nm, 390 nm 395 nm, 400 nm, 405 nm, and 425 nm with input power ranging from 3 to 100 watts, such as available from Shenzhen Chanzon Technology Co., Ltd., ShenZhen, Guangdong, China. The embodiments shown in Figures which follow employ a 100 watt array, 450 nm peak output. Larger arrays can be built up from constituent chips to serve the requirements of the instant invention for larger scale applications.

As disclosed in US Patent Publication 2022/0008889, application Ser. No. 16/923,079 to Jackson et al., one can form a Medium Wavelength Infrared (MWIR) emitter that comprises an emissive powder coat for enhanced emission. A powder coat MWIR emitter, e.g., ground or powdered borosilicate glass, can be put onto a surface which is heated for operation according to the invention. Further, one can use known powdered, sintered, or particulate materials (such as powder coats) comprising borosilicate glass or other glasses or MWIR emissive materials, to provide the main radiation source that establishes the specific Medium Wavelength Infrared MWIR called for in service of the invention as taught and claimed.

Exposures and MWIR Generation

In Jackson '0008889, there is disclosed specifically a advantageous, compact proximity pass-through configuration illuminator according to the invention. Inside a housing are an IRID emitter and a MWIR emitter. The IRID emitter and the MWIR emitter are sized, positioned and oriented to allow light output from each to be substantially superposed for directing to a harvest tailings load or seeds S. In this configuration, light generated emerging from the IRID emitter passes through the physical MWIR emitter. The MWIR emitter can comprise glass in various forms, such as plate glass, and be can be any of borosilicate glass, glass known as Pyrex® Glass Code 7740, soda lime glass, and other materials like aluminum oxide ceramic, and any such as that having high thermal emissivity in the range of Medium Wavelength Infrared wavelengths as defined herein. This can include materials having coatings or surface treatments that have favorable MWIR emission characteristics.

A MWIR emitter can be heated using a heater in thermal communication with glass (e.g., borosilicate glass). Borosilicate glass and other similar materials conduct heat across themselves, and this heated glass allows efficient coupling into MWIR wavelengths and allows a pass-through of Indigo Region Illumination Distribution light as shown. The heater can be a heat source in the form of commercially available known tubular (e.g., halogen) electric lamps.

To practice the instant teachings, the wavelength of the MWIR emitter figures importantly, with 2-8 microns preferred, including 3-5 microns. Tubular lamps provide such radiation in service of the instant invention, or provide thermal excitation to produce such radiation by exciting or heating borosilicate glass or known oxides. They tend to follow closely Wen's displacement law, which states that the black-body radiation curve for different temperatures of the black body will peak at different wavelengths that are inversely proportional to the temperature, a consequence of the Planck radiation law giving the spectral intensity as a function of wavelength for a given temperature. Wen's displacement law states $$\lambda_{peak} = b/T \qquad \text{Eqn 1}$$

where $\lambda_{peak}$ is the peak wavelength (microns); b is Wen's displacement constant, 2898 micron-K; and T is the absolute temperature in Kelvin.

One can use a clear halogen lamp with a pyrex outer jacket, operating temperature 2400K, with a peak output wavelength of 1.3 microns. This lamp is preferred to obtain high radiation output because of its high operating temperature, and the output can be used to excite borosilicate glass in proximity, as known by those of ordinary skill in the art of lamp design and heat sources. Alternatively, one can use a commercially available ruby/gold-plated halogen lamp spectral density for a clear halogen lamp with a pyrex outer jacket, operating temperature 1800 K, with a peak output wavelength of 1.6 microns. Another alternative is a clear halogen lamp with a carbon fiber filament and a quartz outer jacket, operating temperature 1200 K, with a peak output wavelength of 2.5 microns. This lamp is preferred when using as a direct light source to practice the instant invention, because the substantial share of the radiation output is at the preferred range of 2-8 microns. These lamps (not shown) are standard configurations and available from Lianyungang O-Yate Lighting Electrical Co., Ltd, Lianyungang City, Jiangsu Province, China.

Another option for constructing an effective MWIR emitter is to use an emitter that comprises an emissive powder coat for enhanced emission. A powder coat MWR emitter, e.g., ground or powdered borosilicate glass, can be put onto a surface which is heated for operation (such as by use of the above lamps) according to the invention. Specifically, a powder coat MWIR emitter is affixed or coated upon a heated substrate, which can derive heat from a heater or the tubular lamps alluded to above. Rays from any Indigo Region Illumination Distribution IRID source can pass though the powder coat if desired. This embodiment can reduce costs and weight, and can allow for optimization of output. This allows the powder coat to be illuminated independently to provide heating. This excitation can include optical radiation (in a variety of possible wavelengths) such as from lamps; glowing filaments or other bodies, microwave radiation, laser light, and flood and spot lamps, such as high intensity halogen enhance filament lamps, or LED lamps, using known reflector or other optics. Arrays can be used that are proximate the powder coat MWIR emitter along a length, or a spot beam can be used. One can use known powdered, sintered, or particulate materials, comprising borosilicate glass or other glasses or MWIR emissive materials, to provide the main radiation source that establishes the specific Medium Wavelength Infrared (MWIR) called for in service of the invention. In addition, an MWIR emitter can be externally optically energized from a distance—or heated with an external lamp or source (not shown) as those of ordinary skill in the art can appreciate.

It should be noted that based on experimental tests, we concluded that borosilicate glass provides more effective results than anything else tested, including heated quartz. The success of the borosilicate helps to confirm MWIR wavelengths are a key component of borosilicate emissions that destroy the weed seeds, and that UV (ultraviolet light) is not needed.

In various experiments, testing on soybean tailings (weed seeds and chaff), as well as tumbleweed seeds, and giant ragweed seeds, output from the protocol was planted in pots and grown in greenhouse conditions. We discovered that certain energies and irradiances worked to produce unanticipated results. As noted below, the remarkable effectiveness of using borosilicate glass (and to a lesser extent, certain other glasses) to act as a MWIR emitter was unexpected, and represents an unnatural exposure, because sunlight contains very little Medium Wavelength Infrared in the range of 2-8 or 2-20 microns. The addition of Indigo Region Illumination Distribution radiation helped increase efficacity further, especially with certain seeds.

From experimentation on various seeds, in various physical conditions, such as with and without damage, and with and without associated dry or scaly chaff, a number of effective operating regimes or exposures for the instant invention were discovered to work statistically, as follows, with the following as a minimum: illumination to achieve a minimum of at least one of 2 Joules/cm$^2$ cumulative illumination energy, and 0.2 W/cm$^2$ irradiance, but no more than 7 W/cm$^2$ average irradiance, of a light wavelength distribution comprising at least one of an Indigo Region Illumination Distribution (IRID) and infrared radiation that is substantially Medium Wavelength Infrared (MWIR)) radiation.

The Medium Wavelength Infrared radiation preferably includes a narrower range of wavelengths, namely, including substantially wavelengths ranging from 2 to 8 microns.

The Indigo Region Illumination Distribution preferably includes a narrow range of wavelengths, namely including substantially wavelengths ranging from 400 to 500 nanometers.

The apportionment between Medium Wavelength Infrared and Indigo Region Illumination Distribution in the illumination can be wholly one or the other or any apportionment in between, such as 90% Medium Wavelength Infrared and 10% Indigo Region Illumination Distribution, and the light wavelength distribution can be proportioned to be between 6 and 30 percent Indigo Region Illumination Distribution.

The most preferred, by far, of protocols was a strange discovery. Much better results were obtained using Medium Wavelength Infrared radiation that originates at least in part from any of borosilicate glass, Pyrex® Glass Code 7740, soda lime glass, aluminum oxide ceramic, and a powder coat. This is an unnatural exposure. Sunlight has very little spectral irradiance in the Medium Wavelength Infrared range, about 0.005 W/cm$^2$. Based on newer tests that plant tailings into pots after treatment, samples treated using Medium Wavelength Infrared radiation specifically emanating from borosilicate glass (Pyrex®) got better results than anything else tested, included quartz and various tubular lamps as discussed above. The success of the borosilicate emissions helps to confirm MWIR wavelengths are a key component for success in changing the state of weed seeds to having reduced germination viability. Ultraviolet was found to be not needed, and the preference for the Indigo Region Illumination Distribution radiation to be substantially 400-500 nm increases efficacity and efficiency for the process.

Statistical success relied upon a thorough attempt to illuminate weed seeds as part of a harvest tailings mass, and reflected light from a reflector was very advantageous to insure that many weed seeds got exposure on two sides, even if those two sides were not 180 degrees apart.

Regarding the use of the Indigo Region Illumination Distribution, we discovered that it allows getting performance of the invention from a broader group of seeds. Seeds with a greenish color like foxtail, barley, or wheat seeds with feather out top did very well in testing with a significant portion of the illumination from a Indigo Region Illumination Distribution. Because a seed bank contains a variety of seeds, it is recommended that the Indigo Region Illumination Distribution be part of the protocol.

In practicing the invention, one can use intermittent sources, a flash or flashes, without departing from the scope of the appended claims, but overall, irradiances should be kept to less than 7 W/cm$^2$ average to avoid ignition of combustibles in the tailings mix.

Figure 9:
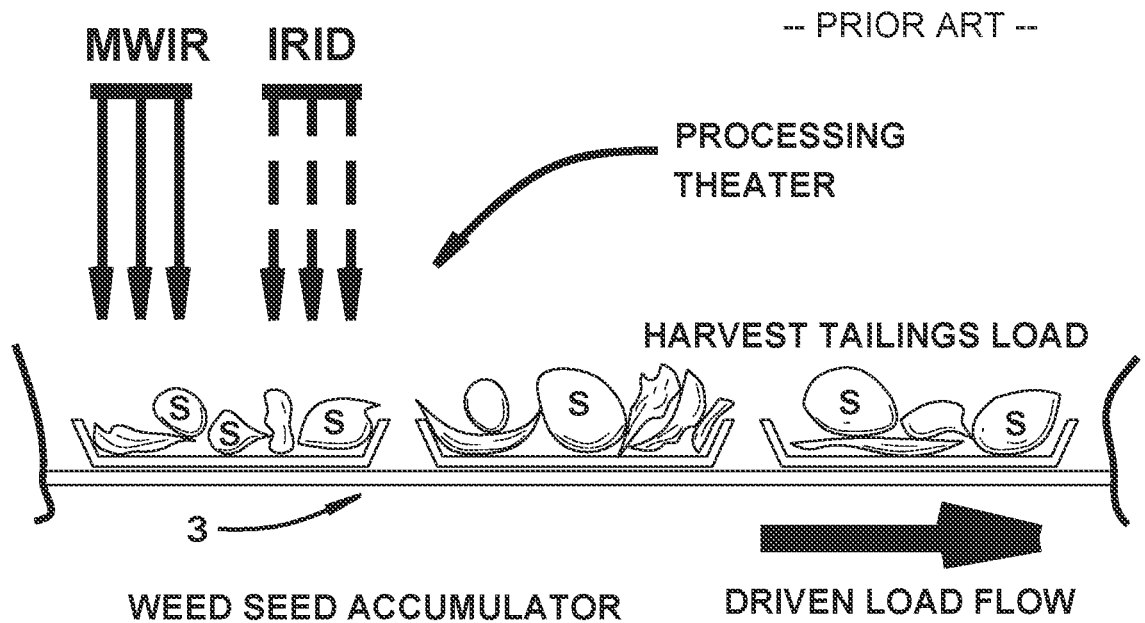
FIG. 9 shows a simple weed seed accumulator providing for a driven load flow in a harvest tailings load in a processing theater according to one embodiment of the invention.

Now referring to FIG. 9, a simple weed seed accumulator 3 is shown providing transport in a processing theater. Individual trays or pockets can be used to transport (DRIVEN LOAD FLOW) to the right in the Figure the tailings inside a processing theater (PROCESSING THEATER) that include seeds S for exposure to an illumination process.

Figure 10:
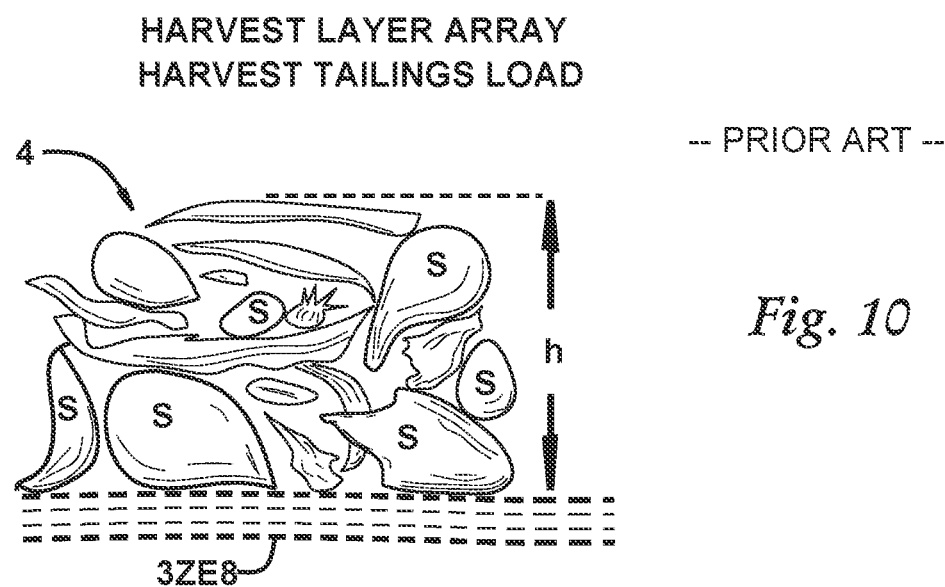
FIG. 10 shows a harvest layer array of harvest to be treated according to the instant invention upon a radiant and transmissive weed seed accumulator belt.

Now referring to FIG. 10, a harvest layer array of harvest is shown in a processing theater 4 to be treated upon a radiant and transmissive weed seed accumulator belt 3ZE8. Good results have been obtained using a layer height h as shown that includes seed 2-3 monolayers high. There is sufficient scatter of light to allow efficient processing to proceed. Illuminator IE8 comprising a MWIR emitter E and/or a IRID emitter 88 is not shown for clarity.

Figure 11:
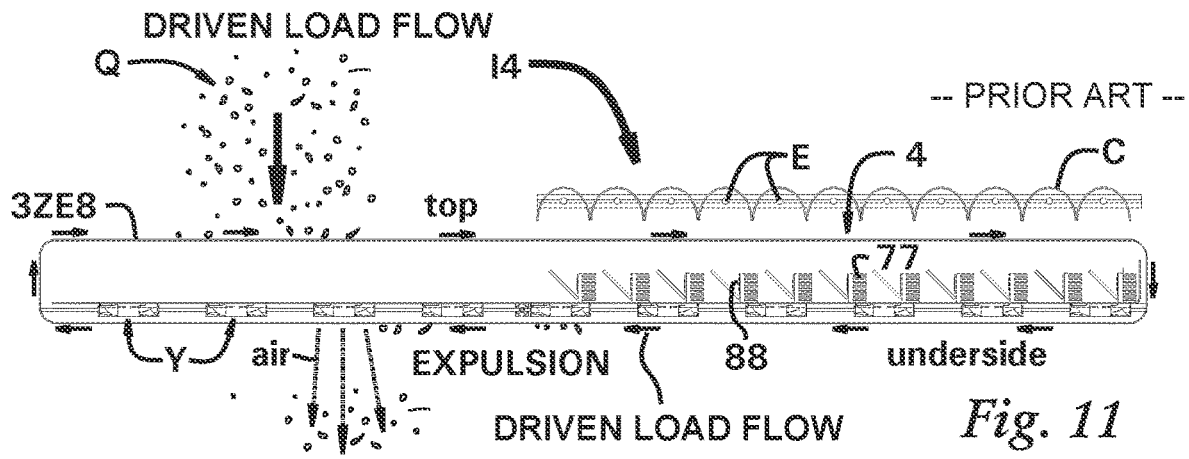
FIG. 11 shows a cross-sectional view of an illuminated external wrap radiant and transmissive weed seed accumulator belt forming an illumination unit according to the invention, and featuring air suction through the belt to attract a harvest in a driven load flow to be treated, and air expulsion through the belt to expel treated harvest.
Figure 12:
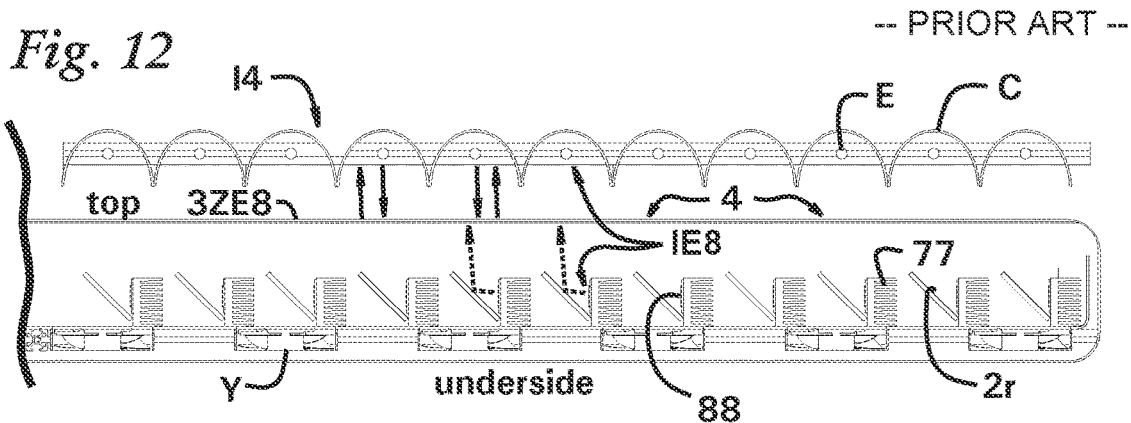
FIG. 12 shows the cross-sectional view of an illuminated external wrap radiant and transmissive weed seed accumulator belt forming an illumination unit according to the invention of FIG. 11, in a partial close-up view.
Figure 13:
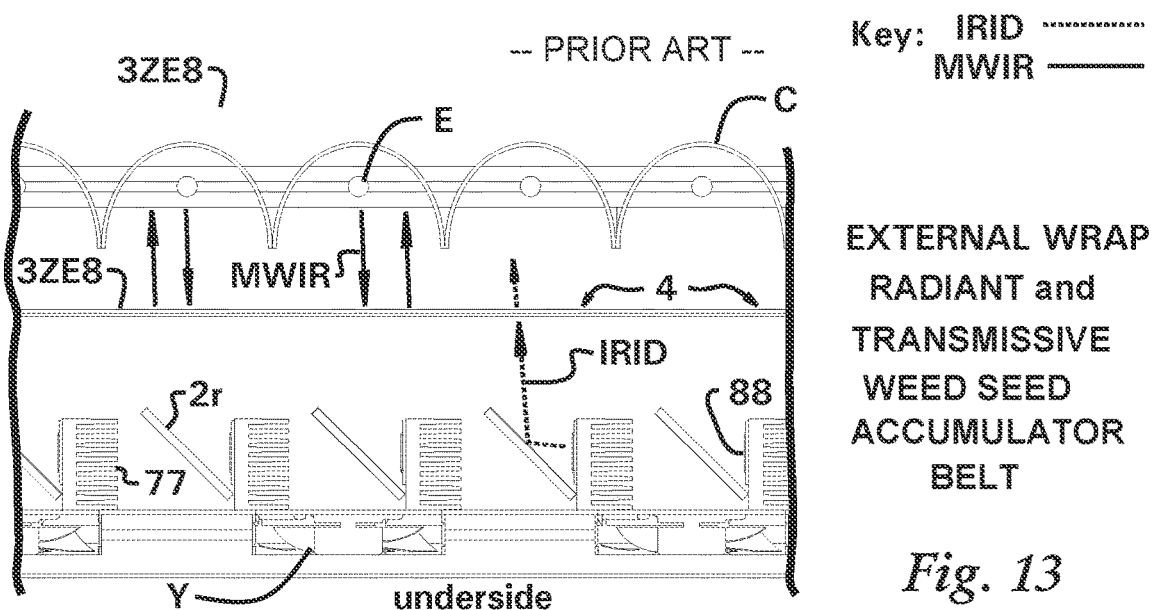
FIG. 13 shows the cross-sectional view of an illuminated external wrap radiant and transmissive weed seed accumulator belt forming an illumination unit according to the invention of FIG. 12, in a further magnified close-up view.

Now referring to FIG. 11, a cross-sectional view of an illuminated external wrap radiant and transmissive weed seed accumulator belt forming an illumination unit 14 according to the invention, and featuring air suction through the belt itself to attract a harvest to be treated, and air expulsion through the belt to expel treated harvest. Referring also to FIG. 12, the cross-sectional view of an illuminated external wrap radiant and transmissive weed seed accumulator belt forming an illumination unit according to the invention of FIG. 11, is shown in a partial close-up view. Referring also to FIG. 13, the cross-sectional view of an illuminated external wrap radiant and transmissive weed seed accumulator belt forming an illumination unit according to the invention of FIG. 12, is shown in a further magnified close-up view.

These FIGS. 11, 12, and 13 depict an illumination unit 14 which comprises a plurality of illuminators IE8 which illuminate a processing theater 4 populated with a harvest Q according to the invention. The illumination unit 14 is formed as shown on the surface of an external wrap radiant and transmissive weed seed accumulator belt 3ZE8, which forms a rectangular wrap as shown in FIG. 11. The radiant and transmissive weed seed accumulator belt 3ZE8 is shown moving in a rectangular track on the Figure page, rotating clockwise on the page of FIG. 11, as shown by the transport or motion arrows which point to the right on the belt top (shown, top); downward on the Figure right side; leftward on the belt underside (underside), and upward on the Figure left side. All of these movements and flows (flow arrows) to move a harvest tailings load constitute a driven load flow (DRIVEN LOAD FLOW) as shown. In the interior of the external wrap of the radiant and transmissive weed seed accumulator belt 3ZE8 are a plurality of IRID emitters 88 mounted therein, with associated heat sinks 77 and a series of reflectors 2r which redirect light as shown in FIG. 13. FIG. 13 shows Indigo Region Illumination Distribution IRID light emitted initially to the left in the Figure, then redirected by reflector 2r to become an upward ray as shown. This upward IRID ray passes through the radiant and transmissive weed seed accumulator belt 3ZE8 to emerge for the purpose of illuminating tailings or a weed seed at processing theater 4.

The plurality of MWIR emitters E and associated curved reflectors C shown perform two functions: they illuminate directly the processing theater 4 and associated tailings, chaff or seeds, shown by the downward Medium Wavelength Infrared MWIR rays; and they heat up the radiant and transmissive weed seed accumulator belt 3ZE8 so it becomes a MWIR emitter itself, and this is shown by the upward Medium Wavelength Infrared MWIR rays. This allows higher total deposited thermal energy of the wavelengths of the protocol and provides for longer thermal radiation dwell times for the tailings to undergo conversion at processing theater 4.

Because the radiant and transmissive weed seed accumulator belt 3ZE8 is porous to air, and because the external wrap formed by the belt is somewhat hermetically sealed (provisions known to those skilled in the mechanical arts, but not shown), a plurality of expulsion fans Y (of known construction) at the belt underside (a second portion of the belt) as shown allow for a negative pressure or vacuum to be created within the interior of radiant and transmissive weed seed accumulator belt 3ZE8. This allows for material handling and transporting the seed to and from the processing theater, specifically radiant and transmissive weed seed accumulator belt 3ZE8. As shown in FIG. 11, a flow (FLOW) of harvest Q descends under vacuum action upon radiant and transmissive weed seed accumulator belt 3ZE8 at a first portion of the belt, with the tailings attracted to, and retained by the belt as it moves rightward on top (chaff and seed material not shown on the belt for clarity). The tailings cling to the belt through processing theater 4, travel downward, and then to the left on the belt underside, where due to gravity and due to the expulsion of air afforded by expulsion fans Y, the tailings are expelled (EXPULSION) downward in the Figure as shown. Because of the illumination provided on the top (top) of the radiant and transmissive weed seed accumulator belt 3ZE8 at processing theater 4, a change of state of the tailings to having reduced germination viability has occurred prior to expulsion. This assembly can be put anywhere there is a tailings flow in a harvester combine, such as in the rear at the exit end behind the lower sieve, where tailings are usually blown out the back of the combine, or sent to a spreader for distribution on the ground.

Figure 14:
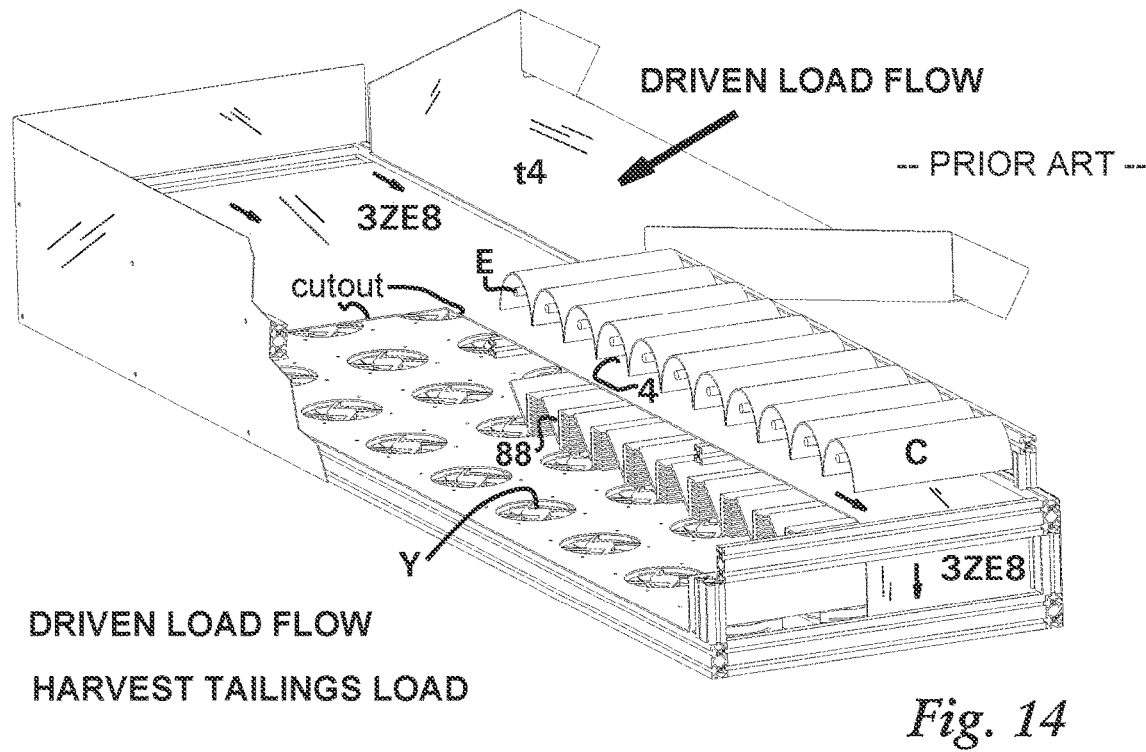
FIGS. 14 and 15 show oblique surface views of the illumination unit of FIGS. 11-13, with FIG. 14 featuring a drawing figure cutout to show interior components normally hidden.

Now referring to FIGS. 14 and 15, oblique surface views of the illumination unit of FIGS. 11-13, are shown, with FIG. 14 featuring a drawing figure cutout to show interior components normally hidden. As depicted, a tailings flow (FLOW) enters a trough or tray t4 and interacts with radiant and transmissive weed seed accumulator belt 3ZE8 which is in motion, driven by a motor and pulley (not shown). The tailings move across the Figure generally to the right, enter processing theater 4, and once there, are exposed to Medium Wavelength Infrared radiation emitted from MWIR emitters E with aid of curved reflectors C, as well as by the thermal emissions of the belt itself, while IRID emitters 88 illuminate the belt underside. The IRID emitters 88 and expulsion fans Y can be seen through a cutout (cutout).

The conveyor represented by radiant and transmissive weed seed accumulator belt 3ZE8 can be of dimensions 47 inches (119 cm) by 89 inches (225 cm). This apparatus can be attached to a harvester combine, such as a Class 6 New Holland CR940 combine with a 30 ft cutting head. Using this configuration and operating at 5 mph (8 km/hr), a typical speed for harvesting wheat, such a combine harvests approximately 18 acres/hour. To calculate the volume of chaff per second (Liters/Sec) to be treated, we use and assume:

1. Chaff/Bushel of Wheat=20 lbs./Bushel
2. Wheat Bushels/Acre=47.7 Bushels/Acre
3. Wheat chaff/Acre=47.7 bushels/acre*20 lbs./bushel=954 lbs of chaff/acre
4. Chaff/hour=18 acres/hour*954 lbs./acre=17,345 lbs./hour, or 4.8 lbs./sec (2.18 kg/sec) From chaff measurements, chaff has an inverse density of 2.54 liters/kg and the chaff volume is therefore 5.5 liters/sec. The system shown must treat approximately 5.5 liters of tailings per second, and can be placed at or near the output between upper and lower sieves of a harvest combine. With the radiant and transmissive weed seed accumulator belt 3ZE8 moving at a speed of 45 inches per second (1.14 m/sec) the illumination unit 14 receives the outgoing chaff volume (approximately 5.5 liters/sec) and spreads it to an approximate thickness of 3 mm (⅛") over the belt. Any clumping or massing of the tailings can be evened out by a screed bar or the like (not shown). The radiant and transmissive weed seed accumulator belt 3ZE8 can be a fiberglass belt of known construction, and borosilicate glass/Pyrex® is preferred.

As disclosed in US Patent Application Publication 2022/0008889, application Ser. No. 16/923,079 to Jackson et al., a combine harvester with functions of reaping, threshing, and separating, can now additionally comprise an illumination unit or illumination process to process harvest tailings or a harvest tailings load. These tailings can instead be treated using a twin process, comprising a mechanical destructive process and an illumination process.

Twin Process

Referring now to FIG. 16, a schematic compilation of qualitative seed/floret characteristics under a treatment by a mechanical destructive process is shown, including physics of impact and relative applied power for efficacity. In this schematic, two weed seeds are compared: *Ambrosia trifida* (GIANT RAGWEED) (left side of Figure) and *Bromus tectorum* (CHEATGRASS) (right side of Figure).

General qualitative differences can be controlling in any mechanical destructive process, and these two seeds differ in how they respond to mechanical operations. Giant ragweed, as shown, has a lower impact resistance, regardless of the mechanical process used (see Mechanical destructive process in the Definitions section), so the word impact must be taken broadly. Giant ragweed has a hard shell and is relatively dense (shown) and this governs the physics of impact. The rotor action on the seed tends to be a slap or graze, and this tends to cause immediate injury. The structure associated with the seed comprises a seed coat, associated shaff and it is glabrous (hairless) (SHOWN). In a mechanical destructive process such as in a seed mill, medium applied power or less must be applied to obtain an 80 percent reduced seedling emergence (SHOWN).

*Bromus tectorum* or cheatgrass as shown, has a higher impact resistance (SHOWN) regardless of the mechanical process used. Cheatgrass seed is surrounded by a structure that can be described as cushioned and feathery (SHOWN) and this in turn, in a different way, governs the physics of impact. The rotor action on the seed tends to be an abrupt launch, and injury is possible, but less likely (SHOWN) and farmers report that the mechanical destructive process is less effective on cheatgrass. The structure associated with the seed comprises glumes, spikelets, florets and awns (AWNS). In a mechanical destructive process such as in a seed mill, high applied power must be applied to obtain an 80 percent reduced seedling emergence (SHOWN) with high dwell in the process, which lowers effective throughput.

In the hybrid beneficially complementary twin process to operate upon impact-resistant seeds (S) that are part of a harvest tailings load disclosed and claimed herein, larger/harder seeds get destroyed mechanically, and high or very high impact-resistant seeds are treated using an illumination process before, during or after the mechanical destructive process. This twin process deals better with challenges in the flow of the harvest tailings load, in handling flow issues, large volumes, and higher moisture levels in the tailings.

Figure 17:
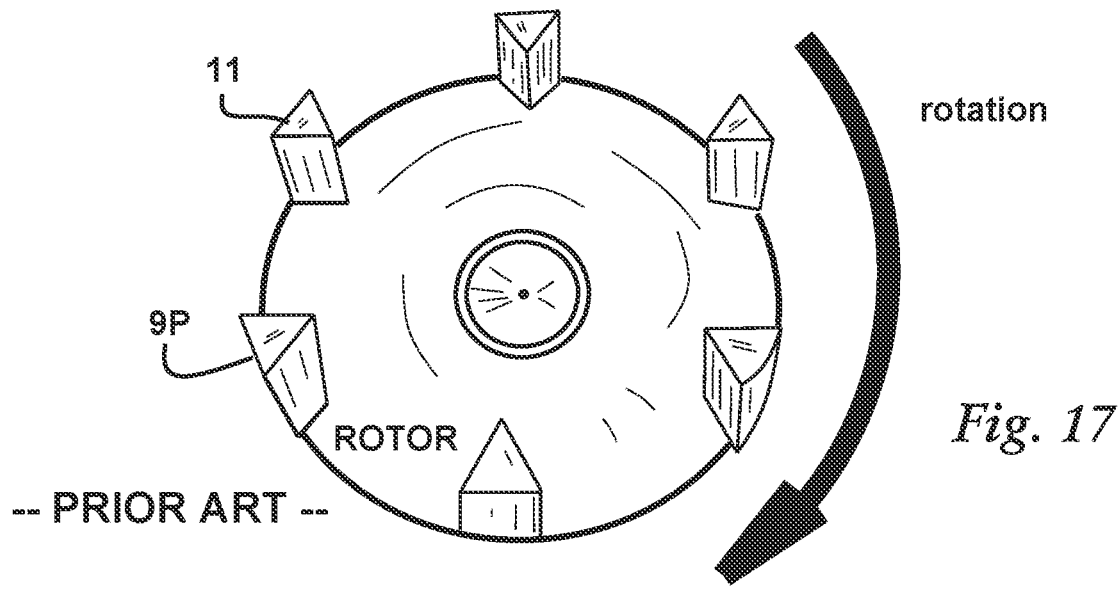
FIG. 17 shows a simple rotor for use in a mechanical destructive process.

Referring now to FIG. 17, a simple rotor for use in a mechanical destructive process is illustratively shown. A disc-like rotor (ROTOR) rotates about a central axis (ROTATION) pointing into the Figure and comprising a plurality of rotor poles 9P which are active elements providing impact into impact-resistant seeds that are part of a harvest tailings load. Rotor shall be a generalized term in this disclosure, shown merely for illustrative purposes to represent a large array of differing mechanical embodiments that can support a mechanical destructive process as defined here.

Figure 18:
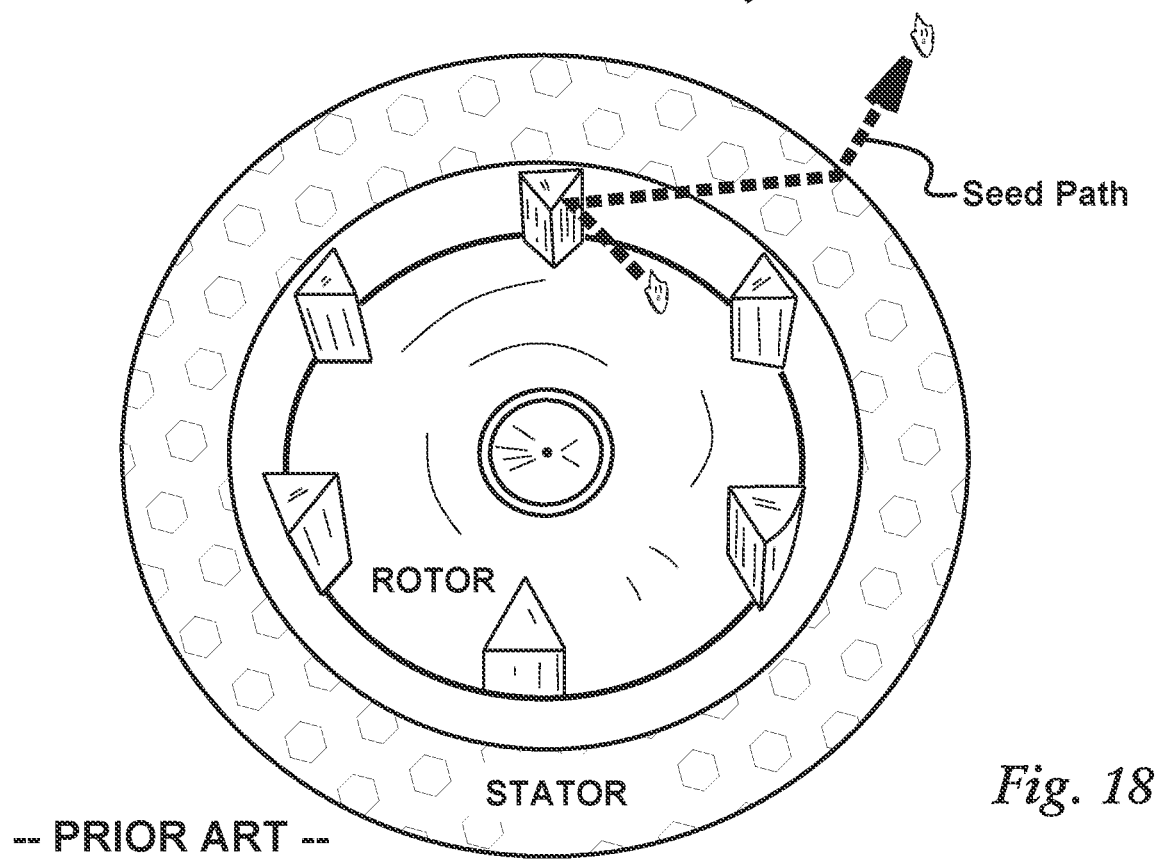
FIG. 18 shows the rotor of FIG. 17, in communication with a stator, and showing an illustrative seed path.

Now referring to FIG. 18, the rotor of FIG. 17 is shown, in communication with a stationary stator (STATOR). The stator is shown schematically without a specific structure shown. Seeds impacted by the rotor can take any number of random paths, and a illustrative seed path (Seed Path) shows a seed S being hit by the rotor, and subsequently passing through the stator where it has a high probability of being injured in a mechanical destructive process.

FIGS. 19-22, and 24-26 portray a commercially available rotor in a prior art mechanical seed destructor manufactured by REDEKOP Saskatoon, SK, Canada.

Figure 19:
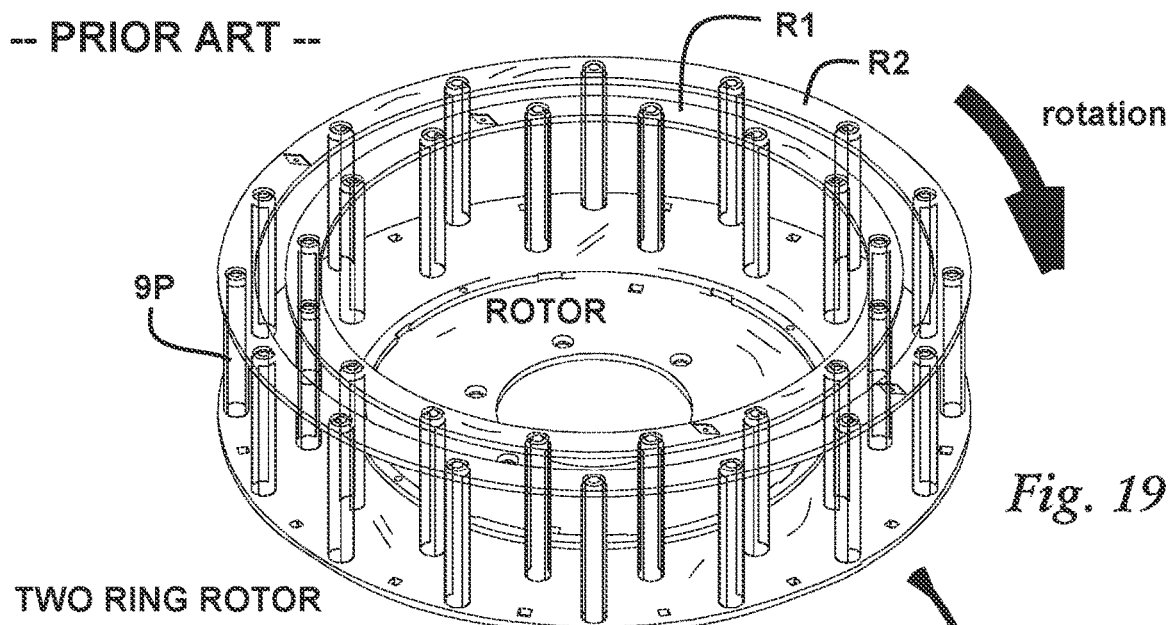
FIG. 19 shows an oblique somewhat transparent surface view of a prior art two-ring rotor used in a mechanical destructive process.

Now referring to FIG. 19, an oblique somewhat transparent surface view of a prior art two-ring rotor used in a mechanical destructive process. The Figure depicts a prior art TWO RING ROTOR comprising two concentrically arrayed rotors R1 and R2 that resemble a so-called squirrel cage fan, but with rotor poles 9P extended between axially displaced supports as shown. When rotated at high speed, rotor poles 9P orbit the central axis of the rotor and are disposed to impact impact-resistant seeds (not shown).

Figure 20:
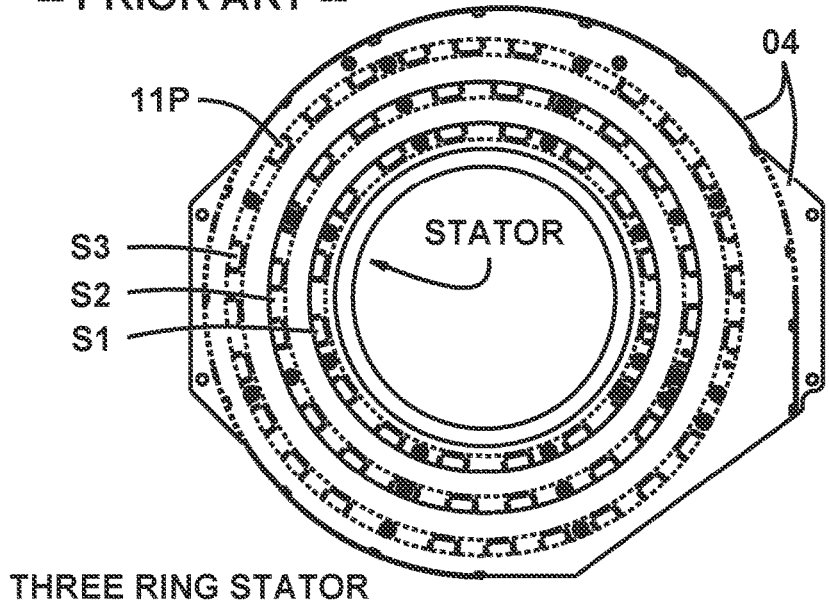
FIG. 20 shows a partial cross-sectional view of a process housing containing a three-ring stator which interleaves and communicates with the two-ring rotor of FIG. 19.

Now referring to FIG. 20, a partial cross-sectional view of a process housing 04 containing a prior art THREE RING STATOR which communicates with the two-ring rotor of FIG. 19 is shown. The three ring stator is stationary and affixedly retained in the housing 04 and comprises individual stator sections S1, S2, and S3 arranged concentrically and each comprising stator poles 11P as shown in cross section. The two ring rotor of FIG. 19 interleaves with the three ring stator of FIG. 20 when assembled (not shown assembled for clarity). This allows that impact-resistant seeds can be impacted and set in motion by the two ring rotor and further damaged upon a glance or direct impact upon any of stator poles 11P of any or all of stator sections S1, S2, and S3. This assembly of rotor and stator is representative only, as those of ordinary skill in the art can devise many other arrangements to provide a mechanical destructive process. As the harvest tailings load and impact-resistant seeds exit in a radial direction from the rotor and stator sections, they become a driven load flow. In this embodiment, a subsequent illumination process will be arrayed on that driven load flow.

Figure 21:
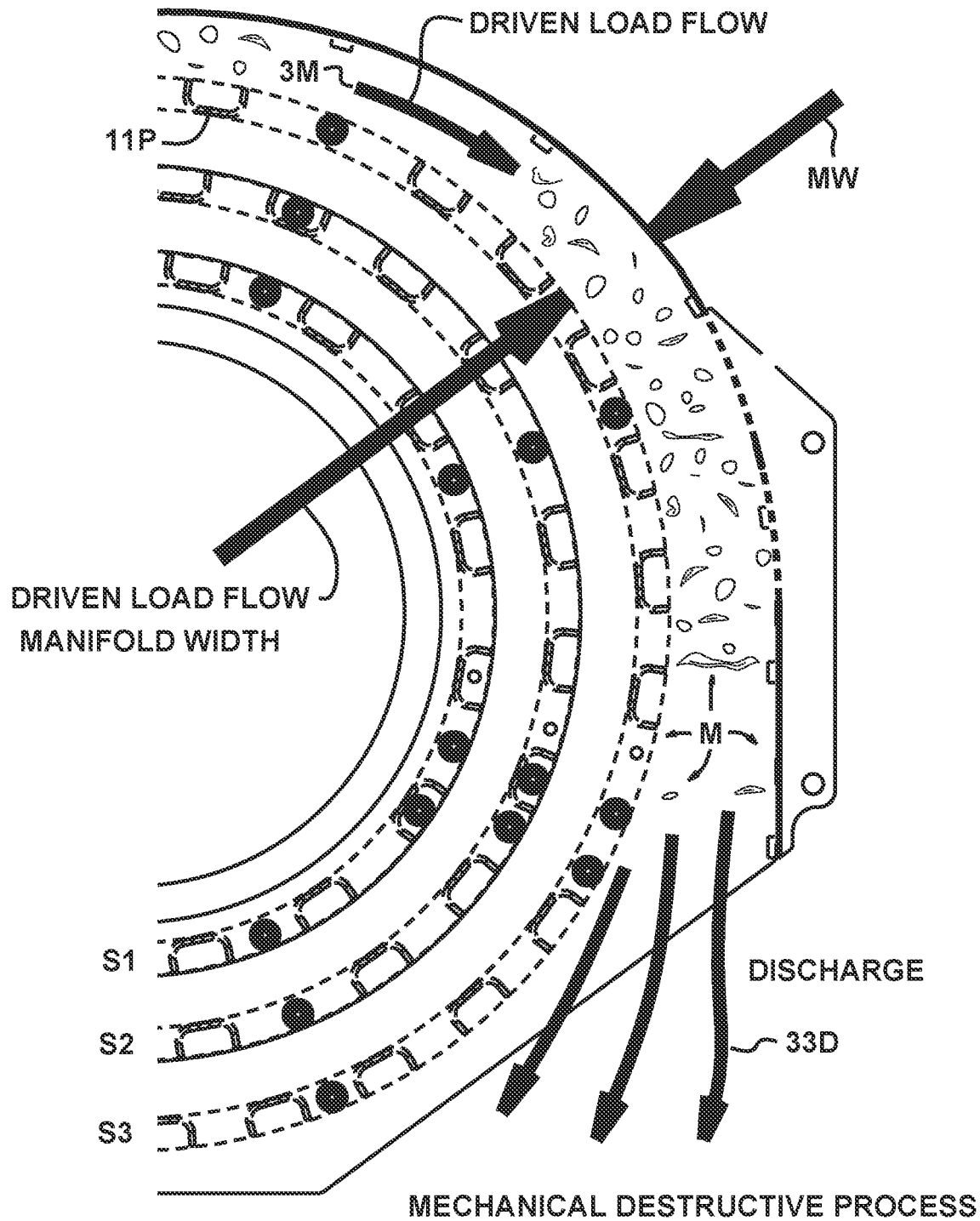
FIG. 21 shows a close-up view of the left half of the process housing and stator of FIG. 20, with a driven load flow manifold width shown for a mechanical destructive process.

Now referring to FIG. 21, a close-up view of the left half of the process housing and stator of FIG. 20 is shown. Radially outside the stator sections S1, S2, and S3 is a driven load flow manifold M which contains and guides the harvest tailings load (seeds and chaff shown) in a driven load flow 3M whose flow is supported by the mechanical destructive process, such as by the push of impacted seeds and the draft provided by the two-ring rotor of FIG. 19. Driven load flow 3M can also be supported in other ways, such as by a dedicated fan or set of moving vanes (not shown). A key parameter that will figure in the method of the invention will be the driven load flow manifold width MW as shown. The driven load flow becomes a DISCHARGE 33D where the harvest tailings load is presumably, for this embodiment, is bound for discharge onto an agricultural field or storage arena.

Figure 22:
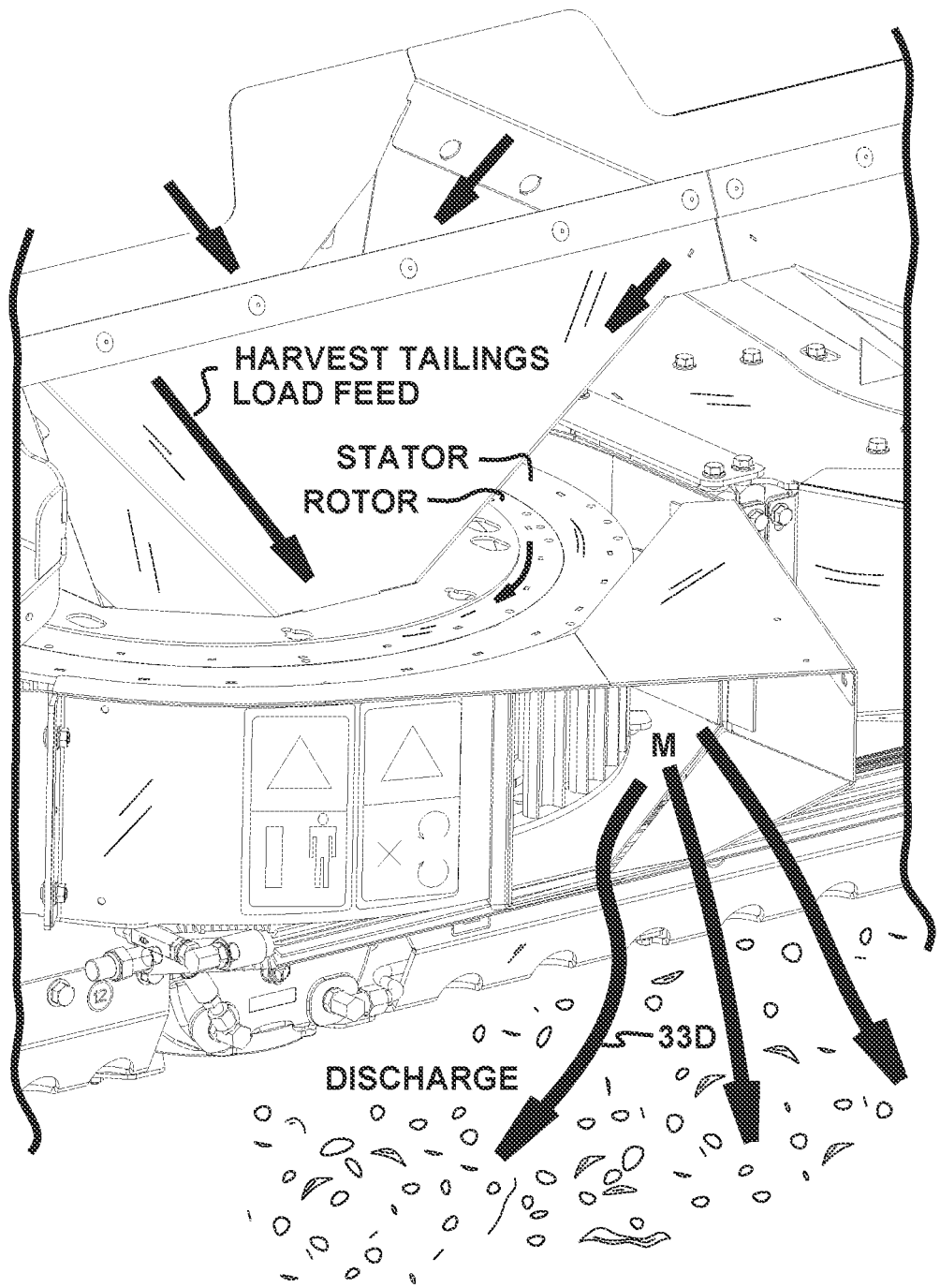
FIG. 22 shows an oblique surface view of a harvest tailings mill or mechanical destructor using a rotor/stator combination similar to that shown in FIGS. 19-21, and showing a harvest tailings load feed and post-treatment harvest tailings load discharge.

Now referring to FIG. 22, an oblique surface view of a prior art harvest tailings mill or mechanical destructor using a rotor/stator combination similar to that shown in FIGS. 19-21, and showing a HARVEST TAILINGS LOAD FEED and post-treatment harvest tailings load DISCHARGE 33D. A ROTOR and STATOR are shown. The HARVEST TAILINGS LOAD FEED originates at a central location, radially toward the inside axis of the rotor, with the harvest tailings load migrating radially outward as seeds and chaff and other material is buffeted from rotor to stator, and then forming a harvest tailings load DISCHARGE 33D as shown.

Figure 23:
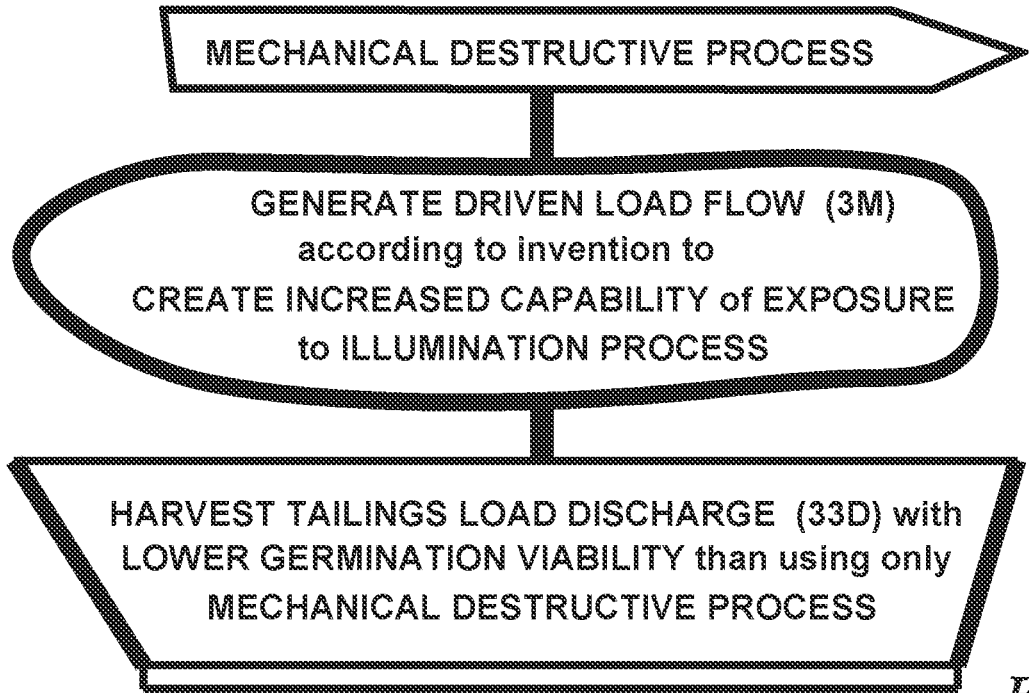
FIG. 23 shows a process schematic for a twin process according to the invention where a mechanical destructive process generates a driven load flow to create increased capability of exposure of a harvest tailings load to an illumination process.

Now referring to FIG. 23, a process schematic for one aspect of a twin process according to the invention is shown where a MECHANICAL DESTRUCTIVE PROCESS generates a DRIVEN LOAD FLOW 3M which is specifically modified according to the instant invention to CREATE INCREASED CAPABILITY OF EXPOSURE of a harvest tailings load to an ILLUMINATION PROCESS. This creates, according to the invention, and as shown in the FIGURE, a HARVEST TAILINGS LOAD DISCHARGE (33D) with LOWER GERMINATION VIABILITY than using only a MECHANICAL DESTRUCTIVE PROCESS.

Figure 24:
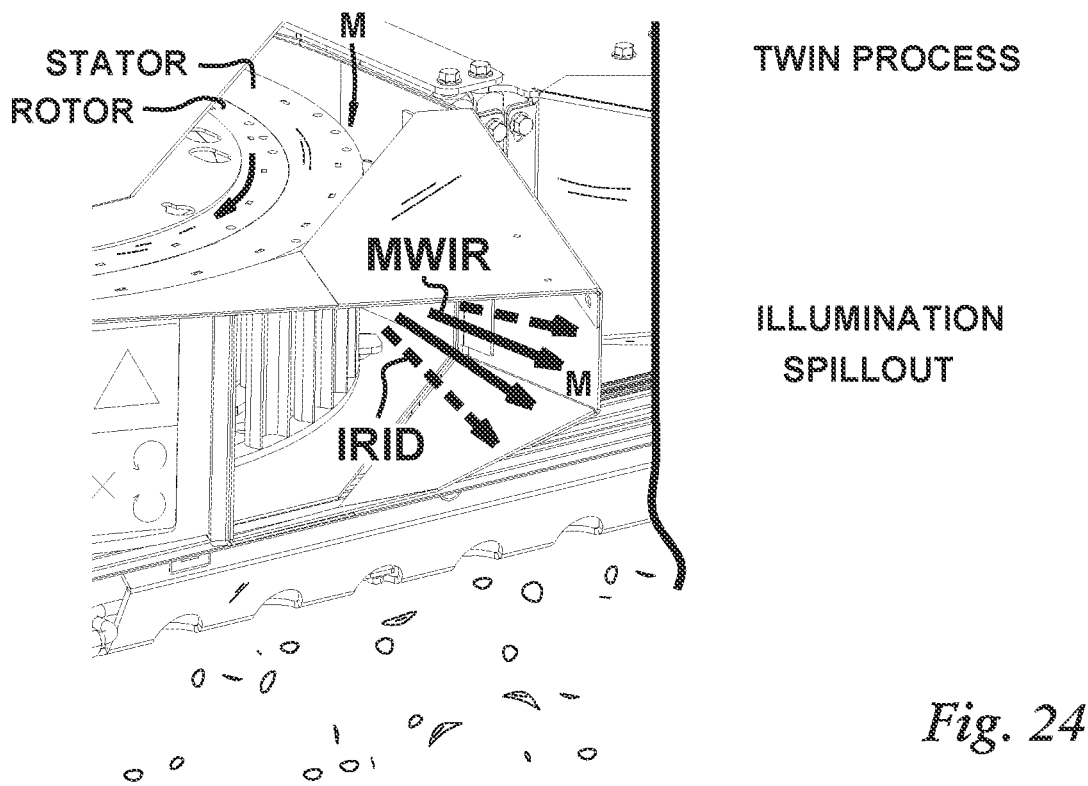
FIG. 24 shows a close-up portion of the harvest tailings mill or mechanical destructor of FIG. 22, adapted to practice a twin process according to the invention, and showing illumination spillout.

Now referring to FIG. 24, a close-up portion of the prior art harvest tailings mill or mechanical destructor of FIG. 22 is shown, now in this FIGURE adapted to practice a twin process according to the invention. As harvest tailings load exits the ROTOR and STATOR, illuminators (not explicitly shown) provide Medium Wavelength Infrared MWIR and Indigo Region Illumination Distribution IRID illumination at selected locations (not shown) in driven load flow manifold M. The illumination can, according to this embodiment, "spill" outward of the process housing into a discharge area. This spillout can extend the efficacity of the illumination process, as processing according to the invention can occur outside the confines of the mechanical destructive process housing 04 labeled in FIG. 22.

Figure 25:
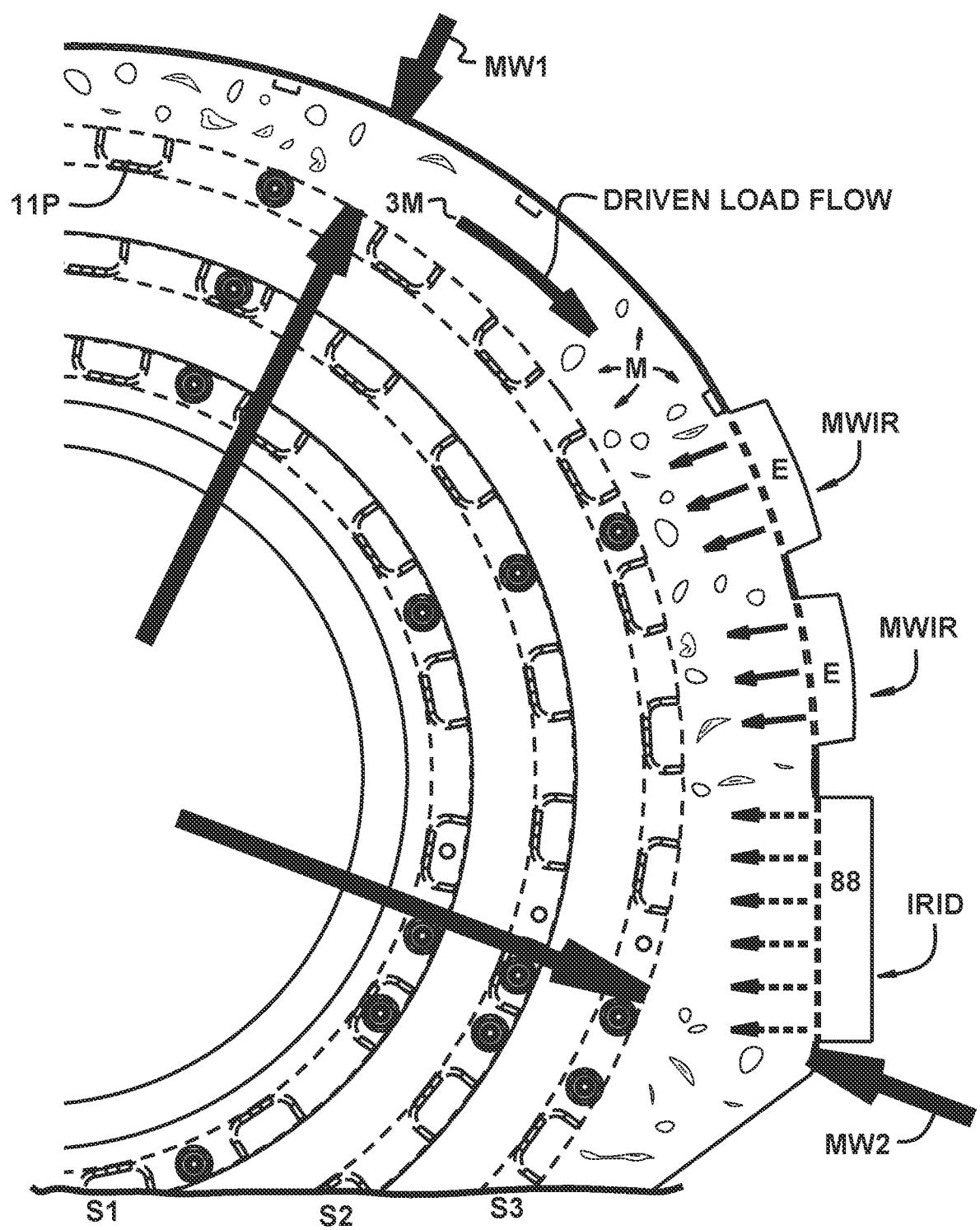
FIG. 25 shows a close-up of the partial cross-sectional view of FIG. 21, and now showing illuminators therein supporting an illumination process with an increase of a driven load flow manifold width.
Figure 26:
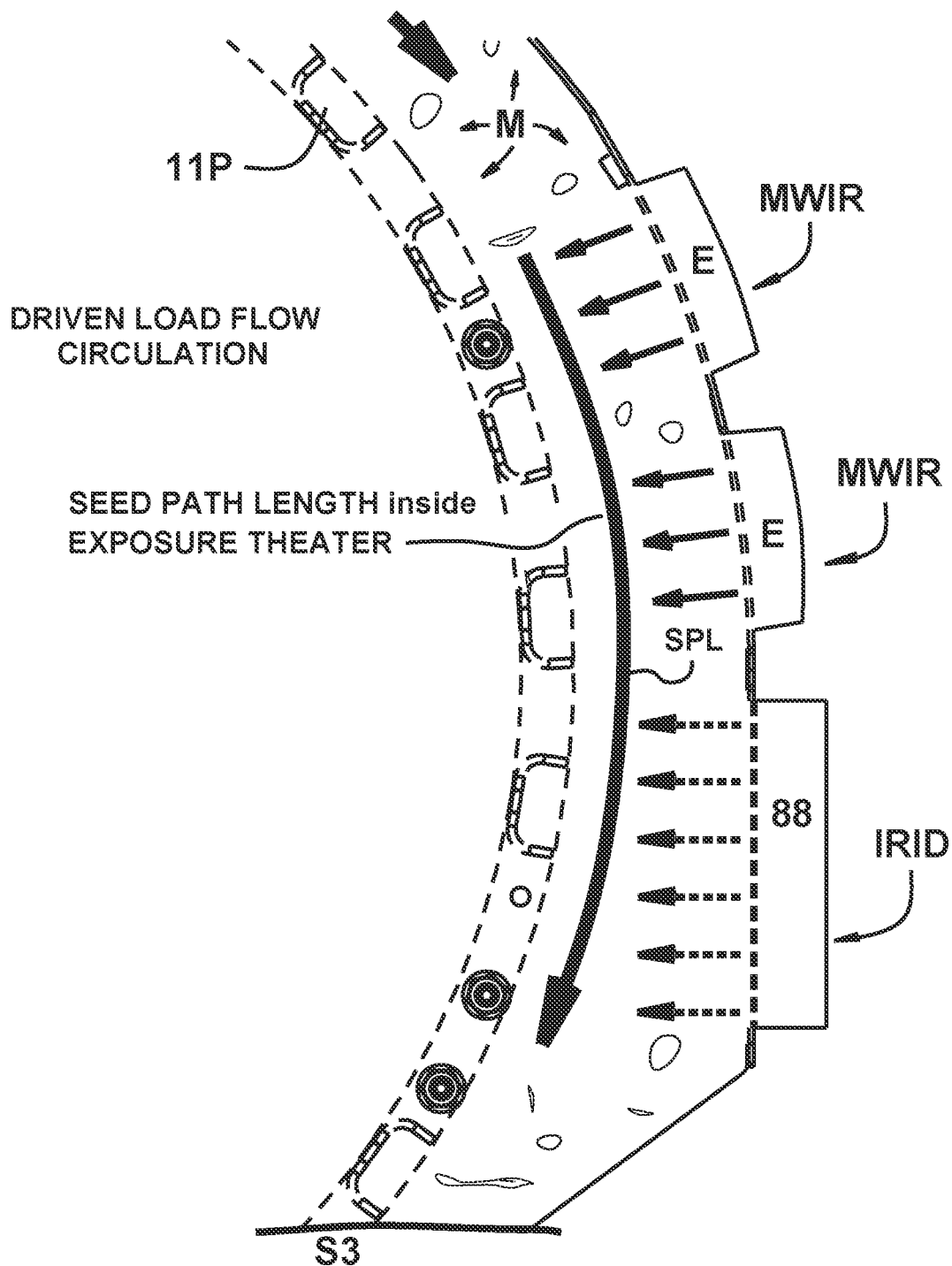
FIG. 26 shows a selected further close-up of FIG. 25, showing driven load flow circulation and seed path length inside a twin process according to the invention.

Now referring to FIGS. 25 and 26, close-ups of the partial cross-sectional view of FIG. 21 are shown, and now showing illuminators therein supporting a TWIN PROCESS according to the invention with an EXPOSURE THEATER inside a DRIVEN LOAD FLOW MANIFOLD (M). In this embodiment, MWIR emitters E and IRID emitters 88 are shown flooding the driven load flow manifold M with illumination intended to treat a harvest tailings load in a driven load flow 3M and DRIVEN LOAD FLOW CIRCULATION as shown. The illumination process is operable upon the driven load flow in the harvest tailings load, and so constructed, sized, oriented, focused, aimed, energized and operated to act upon said impact-resistant seeds.

Driven load flow manifold width is shown increasing as the driven load flow moves downstream toward discharge, with width MW1 shown less than downstream width MW2 as shown. The broadening of the driven load flow manifold width ((MW1 and MW2) is but one way to accomplish a rarefaction of the driven load flow, and only to the extent that this widening is greater than that required to accommodate rotor/stator additions to the driven load flow, will a rarefaction occur. This rarefaction is one way to increase a capability of exposure for the driven load flow according to the invention, as discussed in the Figures below.

In FIG. 26 an illustrative SEED PATH LENGTH inside an EXPOSURE THEATER in the driven load flow manifold M is shown. This circulation does not have to be as it is portrayed in the FIGURE—as a circumferential flow about a spinning rotor. It can be a flow past a reciprocating damage process (not shown), such as moving plates or hammer which dent or crack or injure impact-resistant seeds. The mechanical destructive process and the driven load flow can be further so constructed and operated to allow a circulation for a part of the driven load flow that causes some of the impact-resistant seeds to make two or more iterations under operation of at least part of the illumination process. The mechanical destructive process can be so formed and operated to provide for an exposure time of the impact-resistant seeds of under ½ second, or under 1 second, or under 2 seconds.

To improve capability of exposure, the seed path length can be lengthened, such as by imposing undulations of the driven load flow (not shown), causing seeds to have multiple S-curve paths (not shown) or by causing back-and-forth movements (not shown) or via intermittent delivery as discussed in the description corresponding to FIG. 29 below.

Figure 27:
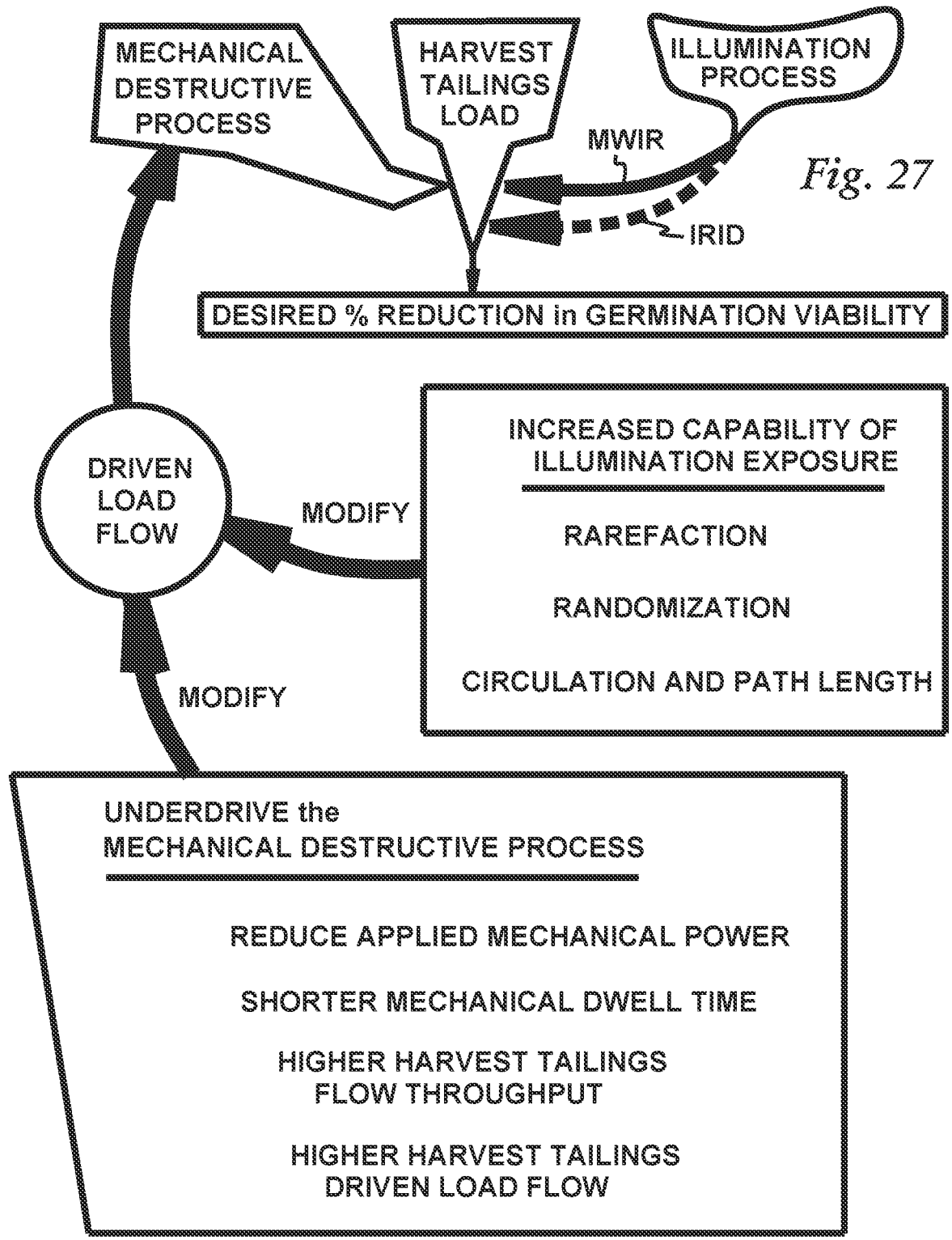
FIG. 27 shows a process schematic for a twin process according to the invention where a driven load flow of a mechanical destructive process is modified to increase capability of illumination exposure, and the mechanical destructive process is underdriven.

Now referring to FIG. 27, a process schematic for a twin process according to the invention is shown where a driven load flow of a MECHANICAL DESTRUCTIVE PROCESS is modified to INCREASE CAPABILITY OF ILLUMINATION EXPOSURE, and the mechanical destructive process can be underdriven.

The increase capability of exposure of the impact-resistant seeds to an illumination process, is essentially increasing it above a capability of exposure obtained without the driven load flow modified as suggested below.

The instant invention can be said to involve modifying one or more driven load flows inside a mechanical destructive process. As shown, a MECHANICAL DESTRUCTIVE PROCESS and an ILLUMINATION PROCESS (MWIR, IRID) before, during or after the mechanical destructive process, are active upon a HARVEST TAILINGS LOAD. The goal is to obtain a DESIRED % REDUCTION in GERMINATION VIABILITY. The mechanical destructive process is modified (MODIFY) by any of changes to support RAREFACTION, RANDOMIZATION, and (seed) CIRCULATION AND PATH LENGTH and this increases capability of illumination exposure to impact-resistant seeds in the driven load flow as shown.

Figure 28:
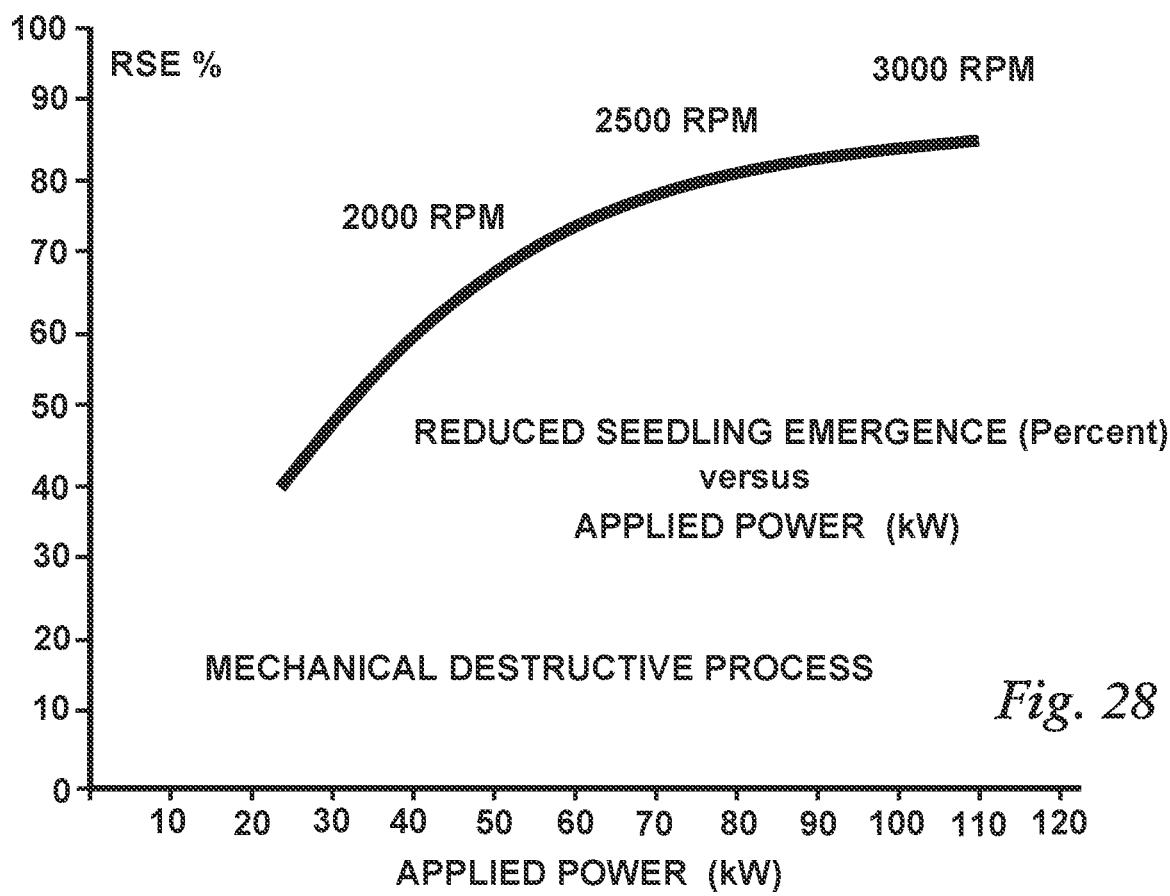
FIG. 28 shows a cartesian plot of percentage reduced seedling emergence for weed seeds treated according to the invention versus applied power of a mechanical destructive process in use.

Another embodiment of the instant invention involves underdriving the mechanical destructive process itself, which ordinarily would be expected to result in a higher germination viability (or lower reduced seedling emergence, see description for FIG. 28). This is counter-intuitive but the illumination process is found to bring the lowered germination viability to sought-after levels. As shown, to practice this aspect of the invention, one seeks to UNDERDRIVE the MECHANICAL DESTRUCTIVE PROCESS by any of: REDUCE APPLIED MECHANICAL POWER to the seed mill or rotor; design the mechanical destructive process and driven load flow for a SHORTER MECHANICAL DWELL TIME for the impact-resistant seeds and driven load flow; design to allow for a HIGHER HARVEST TAILINGS FLOW THROUGHPUT, "skimping" on dedicated time for the mechanical destructive process, also counter-intuitive because it reduces mechanical destructive action—and finally, designing the driven load flow for a HIGHER HARVEST TAILINGS LOAD MATERIAL DENSITY which would allow higher mass flow for harvest tailings load processing, but is also counter-intuitive. The illumination process is thus deployed to "fix" the underdriven mechanical destructive process, making up for its destructive shortcoming, so as to allow the same or higher percentage reduction in germination viability for the discharged harvest tailings load product. The mechanical destructive process can be under-driven with the applied mechanical power down at least forty percent, or alternatively, down at least twenty percent, from what would be required to achieve a higher possible process efficacity. This is part of the instant invention.

Now referring to FIG. 28, a cartesian plot is shown of percentage reduced seedling emergence for weed seeds treated according to the invention versus applied power of a mechanical destructive process in use.

In prior art mechanical destructive processes, it is necessary to boost the applied power, especially power applied to any rotor or the equivalent, to bring about the desired lowering of germination viability in the harvest tailings load discharge product, especially to obtain a lowering of germination viability to allow a post-treatment reduced seedling emergence of higher than about seventy percent.

In the Figure, the REDUCED SEEDLING EMERGENCE (Percent)/RSE is plotted as a function of APPLIED POWER (kW) fora rotor-mediated mechanical destructive process. Added information is given as rotor revolutions per minute rotational speed (RPM) are given at various applied power points, with 2000 RPM at about 50 kW applied power; 2500 RPM at about 80 kW applied power; and 3000 RPM at about 110 kW applied power. As can be seen, there are diminishing returns for a given applied power after about 70 percent RSE. In high RSE operating regimes, commercially available high powered seed destroyers use substantial energy; encounter high operating costs for energy per hour; encounter high rate component wear; produce high decibel noise for any human operator; and typically require ear protection. In particular, this high applied power is administered to maximize later reduced seedling emergence—and obtain the highest possible reduced germination viability—across a varied set of plant species are being encountered in the field. In this sense, seeds that have high resistance to impact like cheatgrass can drive the process requirements into an undesirable operating regime. Not shown in the Figure is the effect of harvest tailings load moisture content on reduced seedling emergence. As moisture content goes up, RSE goes down, further exacerbating this situation.

Example of an Underdriven Mechanical Destructive Process

A prior art mechanical destructive process coupled to a harvesting process can encounter a chaff or tailings yield of 33% or more of the grain yield. During harvesting, this can translate to 1.5 to 2.5 tons per hectare (10,000 m$^2$) and require 48-78 kW operating power (mostly spent applying power to and driving one or more rotors). A normal ongoing operating load for the mechanical destructive process can be 65 kW, with a typical rotor driven angular speed of 3025-3075 RPM. Tailings or chaff delivery to that process can be 3 kg/sec while harvesting 30-60 tons/hr. The impact-resistant seeds treated therein can travel up to 400 km/hr in the destruction process, creating noise, mechanical wear and dust.

One can take a typical prior art mechanical destructive process meant to provide a reduced seedling emergence (RSE) of over 85% and run it instead with a reduced rotor speed of 1800 RPM, and with applied power of 30 kW—under 50% of typical applied power, and with lower noise, dust production, and mechanical wear. This results typically in a higher germination viability allowed from the mechanical destructive process alone. In this example, running the rotor at 1800 RPM in a mechanical destructive process might only provide for a reduced seedling emergence of 60%. However, using the instant teachings, the illumination process is sufficient, along with increased capability of exposure, to allow the illumination to create a twin process harvest tailings load discharge that possesses a lower germination viability than if created without the illumination process energized. This can boost the reduced seedling emergence back to 85% or higher, and the applied power for the illumination process can be only an additional 7.5 kW including augering or other mechanical processes and other inefficiencies. Those of ordinary skill can take the instant teachings and apply them to specific operating regimes, applied powers, and a specific mechanical destructive process to serve similar goals in running an underdriven process.

Figure 29:
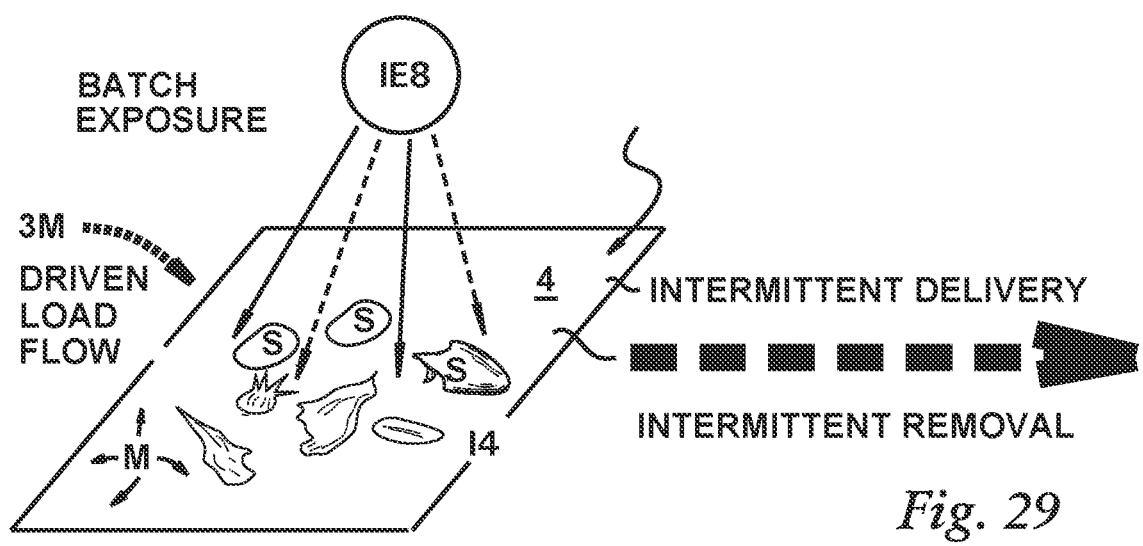
FIG. 29 shows a schematic with surface view of an intermittent batch process for moving and exposing a driven load flow according to the invention.

Now referring to FIG. 29, a schematic with surface view of an intermittent batch process for moving and exposing a driven load flow according to the invention is shown. The exposure of the harvest tailings load to the illumination process does not have to be continuous, in spite of the driven load flow. One is free to employ a BATCH EXPOSURE as shown, where a processing or exposure theater 4, which can be a surface DRIVEN LOAD FLOW MANIFOLD SHELF or simply a volume in space, accommodates a DRIVEN LOAD FLOW 3M via INTERMITTENT DELIVERY and INTERMITTENT REMOVAL. The driven load flow can be in motion, or be substantially stationary, while being illuminated in an illumination process according to the invention.

Figure 30:
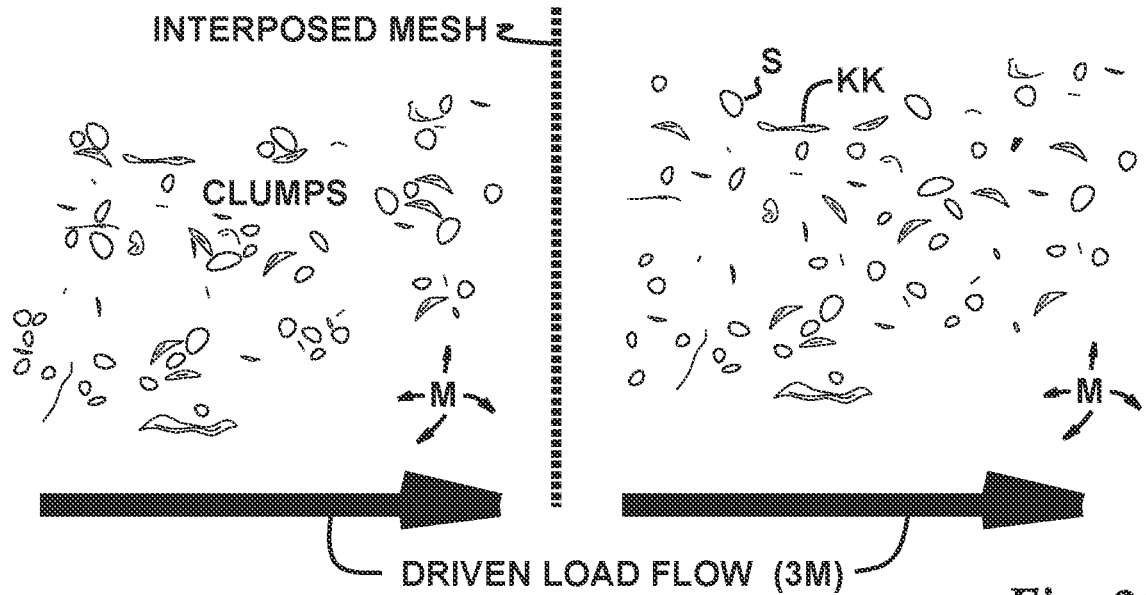
FIG. 30 shows an illustrative cross-sectional schematic of randomization of contents of a harvest tailings load of a driven load flow according to the invention.
Figure 31:
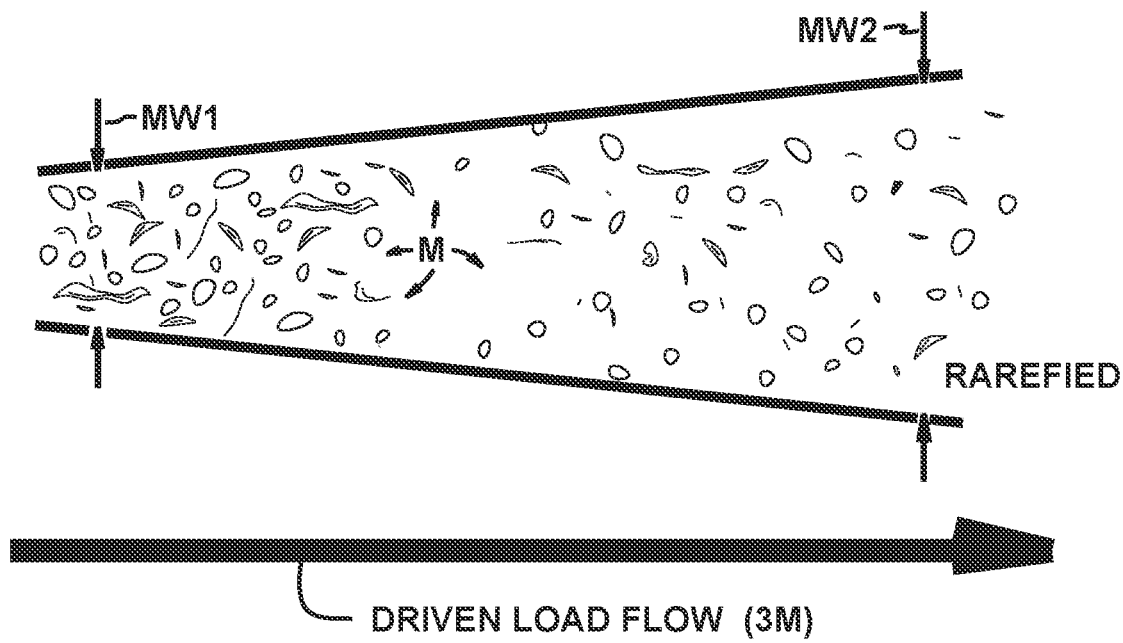
FIG. 31 shows an illustrative cross-sectional schematic of rarefaction of contents of a harvest tailings load of a driven load flow according to the invention.

Now referring to FIG. 30, an illustrative cross-sectional schematic is shown of one embodiment of the invention where randomization of contents of a harvest tailings load is effected for a driven load flow inside a driven load flow manifold M according to the invention. A driven load flow 3M in a harvest tailings load can contain clumps of impact-resistant seeds S and associated chaff KK and other materials. Such clumps, or masses, concentrations, agglomerations, accumulations, wadding or binding—of separate impact-resistant seeds and associated chaff, MOG (Material Other than Grain) and confounding material—is to be expected in an agricultural environment.

One illustrative embodiment of the invention is to increase capability of exposure of the driven load flow to an illumination process by breaking up clumped material. This can be effected using a mesh or grid or screen or other methods when interposed in the driven load flow 3M stream as shown. Such methods can be devised by those with ordinary skill in the mechanical arts, and the use of such methods provides randomization and an unexpected benefit for increased capability of exposure for the illumination process as taught and claimed herein.

Alternatively if using the intermittent shelf as shown in FIG. 29, one can break up the clumps using shelf vibration, that is, applied vibration, using known mechanical methods, of a driven load flow manifold shelf. The mechanical destructive process and the driven load flow can be formed to randomize the harvest tailings load by at least one of mixing and also decreasing material density of the harvest tailings load.

Now referring to FIG. 31, an illustrative cross-sectional schematic is shown of one embodiment of the invention where rarefaction of contents of a harvest tailings load is effected for a driven load flow inside a driven load flow manifold M according to the invention. This can be accomplished illustratively by increasing the driven load flow manifold width or cross-section. This is shown in the Figure, where the driven load flow manifold width MW2 is greater downstream than the upstream driven load flow manifold width MW1, giving a wider driven load flow cross-section beyond that which would be required to accommodate increasing volumes of material (not shown) naturally being expelled across the effective portion of a rotor/stator combination in the mechanical destructive process.

This twin process can be practiced in many ways, as those of ordinary skill in the art can appreciate, including ways not explicitly shown here. The illumination step can occur as shown here in various figures, but instead where it is not proximate to, and apart physically from the mechanical destructive process. See FIGS. 11-13.

Further, the driven load flow does not have to be located in or around or proximate—to the rotor of the mechanical destructive process.

By modifying the driven load flow as taught and claimed herein, the hybrid complementary twin process can easily match and exceed the lowered germination viability that would otherwise be obtained with the "add-on" twin process disclosed in Jackson '0008889 that would suffer from a greater energy operational cost, higher noise, higher mechanical wear, higher dust generation. Impact-resistant seeds would not have to be pulverized by driving a mechanical destructive process into unfavorable operating regimes.

Multiple applications of the instant invention, such as lower dose applications can be contemplated whereby impaired germination viability increases upon multiple applications.

An illumination unit, comprising an illuminator and a processing theater can go in back of combine, on a trailer, or be integrated into another machine. One can add, without departing from the appended claims, more sieves or other sorting, threshing, cutting, straw walking, and detritus-eliminating steps without departing from the appended claims.

The invention can be set in motion using known means to accomplish the same objectives over a wide area, such as a wide processing theater, perhaps on the ground plane or on soil. Other harvest transport methods, such as pulsed shots of air, can be used to moved harvest to and from a processing theater using known techniques from the materials handling arts without departing from the scope of the appended claims. Autonomous, non-autonomous, powered, or non-powered vehicles can be used to illuminate or treat a field, using illumination as taught and claimed, or using communication to other, external light sources. The invention can also be combined with other processes, including transport, cleaning and sorting processes not mentioned in this disclosure without departing from the appended claims.

Known imaging optics can be added to practice the protocol of the invention, including beam forming using parabolic curved sections, or sections that resemble a compound parabolic curve; and non-imaging optics can also be used. If desired, one can redirect all electromagnetic emissions as taught and claimed in the instant disclosure using mirrors, lenses, foil arrays, or light guides and pipes without departing from the scope of the invention. Similarly, those of ordinary skill can add light wavelengths to the exposure protocols without departing from the invention or the appended claims. Addition of red light was found to have no significant increase in effectiveness, but other objectives can be served if desired, namely, one can add illuminating power, or wavelengths or over-expose generally without departing from the scope of the invention or claims. After achieving illumination minimums as stipulated, further illumination can be used without departing from the scope of the appended claims.

Measurement units were chosen illustratively and in the appended claims include irradiance in $W/cm^2$ but radiance or other similar measures can be used and would by fair conversion read upon the appended claims if equivalent.

For clarity, the invention has been described in structural and functional terms. Those reading the appended claims will appreciate that those skilled in the art can formulate, based on the teachings herein, embodiments not specifically presented here.

Production, whether intentional or not, of irradiance levels that are under the magnitude of powers as given in the appended claims shall not be considered a departure from the claims if a power level as claimed is used at any time during treatment.

The illumination protocol disclosed and claimed can be supplemented with visible light, which can enhance user safety by increasing avoidance and can allow for pupil contraction of the eye of an operator; other radiations can be added with without departing from the appended claims.

The invention, in effecting a change of state to having reduced germination viability of a seed, can be performed on site, such as agricultural field, or remotely at a later time and place.

There is obviously much freedom to exercise the elements or steps of the invention.

The description is given here to enable those of ordinary skill in the art to practice the invention. Many configurations are possible using the instant teachings, and the configurations and arrangements given here are only illustrative.

Those with ordinary skill in the art will, based on these teachings, be able to modify the invention as shown.

The invention as disclosed using the above examples may be practiced using only some of the optional features mentioned above. Also, nothing as taught and claimed here shall preclude addition of other structures, functional elements, or systems.

Obviously, many modifications and variations of the present invention are possible in light of the above teaching. It is therefore to be understood that, within the scope of the appended claims, the invention may be practiced otherwise than as specifically described or suggested here.

We claim:

1. A hybrid beneficially complementary twin process to operate upon impact-resistant seeds(S) that are part of a harvest tailings load, to induce a change of state in said impact-resistant seeds to having reduced germination viability in a time under one minute, said twin process comprising:
    [1] a mechanical destructive process so constructed, sized, and operated [a] to be operable upon said harvest tailings load and upon said impact-resistant seeds, and [b] to generate forceably a driven load flow in said harvest tailings load, said driven load flow so formed to increase capability of exposure of said impact-resistant seeds(S) to an illumination process, above a capability of exposure obtained without said driven load flow; and wherein said driven load flow comprises at least one of rarefaction, randomization, and circulation of said harvest tailings load;
    [2] said illumination process operable upon said driven load flow in said harvest tailings load, and so constructed, sized, oriented, focused, aimed, energized and operated to act upon said impact-resistant seeds [a] sufficiently to allow illumination to achieve a minimum of at least one of 2 Joules/$cm^2$ cumulative illumination energy, and 0.2 W/$cm^2$ irradiance, but no more than 7 W/$cm^2$ average irradiance, of a light wavelength distribution comprising at least one of an Indigo Region Illumination Distribution (IRID) and infrared radiation that is substantially Medium Wavelength Infrared (MWIR) radiation, and
    [b] sufficient, along with said increased capability of exposure, to allow illumination to create a twin process harvest tailings load discharge that possesses a lower germination viability than if created without said illumination process energized.

2. The hybrid twin process of claim 1, wherein said mechanical destructive process and said driven load flow are formed to randomize said harvest tailings load by at least one of mixing and decreasing material density of said harvest tailings load.

3. The hybrid twin process of claim 1, wherein said mechanical destructive process and said driven load flow are formed to rarefy said harvest tailings load by action of an increase in at least one of a driven load flow manifold (M) volume increase and and driven load flow manifold width (MW, MW2).

4. The hybrid twin process of claim 1, wherein said mechanical destructive process and said driven load flow are further so constructed and operated to allow a circulation for a part of said driven load flow that causes some of said impact-resistant seeds to make two or more iterations under operation of at least part of said illumination process.

5. The hybrid twin process of claim 1, wherein said mechanical destructive process is underdriven by not being operated to achieve a higher possible process efficacity that would be obtained under at least one of: [a] a greater applied mechanical power, [b] a longer mechanical dwell time for said impact-resistant seeds, [c] a lower flow throughput for said harvest tailings load discharge, and [d] a lower harvest tailings driven load flow.

6. The hybrid twin process of claim 1, wherein said mechanical destructive process is under-driven with said applied mechanical power down at least forty percent from what would be required to achieve a higher possible process efficacity.

7. The hybrid twin process of claim 1, wherein said mechanical destructive process is under-driven with said applied mechanical power down at least twenty percent from what would be required to achieve a higher possible process efficacity.

8. The hybrid twin process of claim 1, wherein said mechanical destructive process is so formed and operated to provide for an exposure time of said impact-resistant seeds of under ½ second.

9. The hybrid twin process of claim 1, wherein said mechanical destructive process is so formed and operated to provide for an exposure time of said impact-resistant seeds of under 1 second.

10. The hybrid twin process of claim 1, wherein said mechanical destructive process is so formed and operated to provide for an exposure time of said impact-resistant seeds of under 2 seconds.

11. The hybrid twin process of claim 1, wherein said mechanical destructive process is so formed and operated such that said illumination process is operable upon said driven load flow while it is in motion.

12. The hybrid twin process of claim 1, wherein said mechanical destructive process is so formed and operated such that said illumination process is operable upon said driven load flow while it is substantially stationary.

13. A harvest tailings mill using a hybrid beneficially complementary twin process to act upon a harvest tailings load containing impact-resistant seeds, said harvest tailings mill comprising:
  [1] a process housing adapted and constructed for accepting said harvest tailings load containing said impact-resistant seeds, and so designed to allow during operation a driven load flow therein;
  [2] a rotor so sized, shaped, bearingly retained and powered to perform a mechanical destructive process upon said impact-resistant seeds introduced via said harvest tailings load in said process housing;
  said process housing and said rotor so further constructed, sized, and operated to generate forceably said driven load flow in said harvest tailings load, such that said driven load flow is so formed to increase capability of exposure of said impact-resistant seeds(S) to an illumination process, above a capability of exposure obtained without said driven load flow
  and wherein said rotor and said process housing are so constructed to create a driven load flow that operates to comprise at least one of rarefaction, randomization, and circulation of said harvest tailings load;
  [3] an illuminator operable upon said driven load flow, and so constructed, sized, oriented, focused, aimed and operated to act upon said impact-resistant seeds to allow illumination access
  [a] sufficient to allow illumination to achieve a minimum of at least one of 2 Joules/cm$^2$ cumulative illumination energy, and 0.2 W/cm$^2$ irradiance, but no more than 7 W/cm$^2$ average irradiance, of a light wavelength distribution comprising at least one of an Indigo Region Illumination Distribution (IRID) and infrared radiation that is substantially Medium Wavelength Infrared (MWIR)) radiation, and
  [b] sufficient to allow illumination to create a twin process harvest tailings load discharge that possesses a lower germination viability than if created without said illumination process energized.

14. The harvest tailings mill of claim 13, wherein said mechanical destructive process and said driven load flow are formed to randomize said harvest tailings load by at least one of mixing and decreasing material density of said harvest tailings load.

15. The harvest tailings mill of claim 13, wherein said mechanical destructive process and said driven load flow are formed to rarefy said harvest tailings load by action of an increase in at least one of a a driven load flow manifold (M) volume increase and and driven load flow manifold width (MW, MW2).

16. The harvest tailings mill of claim 13, wherein said mechanical destructive process and said driven load flow are further so constructed and operated to allow a circulation for a part of said driven load flow that causes some of said impact-resistant seeds to make two or more iterations under operation of at least part of said illumination process.

17. The harvest tailings mill of claim 13, wherein said mechanical destructive process is so formed and operated to provide for an exposure time of said impact-resistant seeds of under 1 second.

18. The harvest tailings mill of claim 13, wherein said mechanical destructive process is so formed and operated to provide for an exposure time of said impact-resistant seeds of under 2 seconds.

* * * * *